United States Patent
Jung et al.

(10) Patent No.: US 11,611,962 B2
(45) Date of Patent: Mar. 21, 2023

(54) METHOD AND APPARATUS FOR TRANSMITTING AND RECEIVING INFORMATION FOR PROVIDING PLURALITY OF COMMUNICATION SERVICES

(71) Applicant: SAMSUNG ELECTRONICS CO., LTD., Suwon-si (KR)

(72) Inventors: Euichang Jung, Seoul (KR); Suha Yoon, Yongin-si (KR); Suyoung Park, Uiwang-si (KR); Sunghyuk Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/357,224

(22) Filed: Jun. 24, 2021

(65) Prior Publication Data

US 2021/0321399 A1  Oct. 14, 2021

Related U.S. Application Data

(63) Continuation of application No. 16/480,749, filed as application No. PCT/KR2018/003450 on Mar. 23, 2018, now Pat. No. 11,051,299.

(30) Foreign Application Priority Data

Mar. 24, 2017  (KR) .................. 10-2017-0037798

(51) Int. Cl.
*H04W 72/04* (2009.01)
*H04W 72/0446* (2023.01)

(52) U.S. Cl.
CPC ..... *H04W 72/0446* (2013.01); *H04W 72/042* (2013.01)

(58) Field of Classification Search
None
See application file for complete search history.

(56) References Cited

U.S. PATENT DOCUMENTS 8,929,319 B2  1/2015  Anderson
10,015,820 B2 *  7/2018  Rahman ................ H04L 5/0005
10,104,683 B2 *  10/2018  Chen .................... H04L 5/0044
(Continued)

FOREIGN PATENT DOCUMENTS

KR  10-2008-0097888  11/2008
KR  10-2011-0117889  10/2011
(Continued)

OTHER PUBLICATIONS

International Search Report for PCT/KR2018/003450, dated Jun. 21, 2018, 6 pages.
(Continued)

*Primary Examiner* — Hong S Cho
(74) *Attorney, Agent, or Firm* — Nixon & Vanderhye, P.C.

(57) ABSTRACT

An example communication method in a terminal of a mobile communication system includes: receiving, from a base station, first information associated with a resource allocation scheme for a first service and a second service; receiving, from the base station, control information associated with the first service; and receiving, from the base station, data for the first service on the basis of the control information and the first information.

21 Claims, 15 Drawing Sheets

(56) References Cited

U.S. PATENT DOCUMENTS

| | | |
|---|---|---|
| 2010/0031111 A1 | 2/2010 | Cai et al. |
| 2010/0265842 A1 | 10/2010 | Khandekar et al. |
| 2011/0170498 A1 | 7/2011 | Liu et al. |
| 2013/0028218 A1 | 1/2013 | Chun et al. |
| 2015/0124670 A1 | 5/2015 | Park |
| 2015/0305003 A1 | 10/2015 | Chen et al. |
| 2018/0063852 A1 | 3/2018 | Kang et al. |
| 2019/0320450 A1 | 10/2019 | Li |
| 2019/0342036 A1 | 11/2019 | Lei |

FOREIGN PATENT DOCUMENTS

| | | |
|---|---|---|
| KR | 10-2012-0022998 | 3/2012 |
| KR | 10-1157369 | 6/2012 |
| KR | 10-2012-0135201 | 12/2012 |
| KR | 10-2016-0131740 | 11/2016 |

OTHER PUBLICATIONS

Written Opinion of the Isa for PCT/KR2018/003450, dated Jun. 21, 2018, 6 pages.

Fujitsu, "DL Control Channel Related to Multiplexing eMBB and URLLC", Nov. 14-18, 2016, 4 pages.

Extended Search Report dated Jan. 17, 2020 in counterpart European Patent Application No. 18771761.6.

Sony: "Considerations on Dynamic Resource Sharing for eMBB/URLLC in DL", 3GPP Draft; R1-1700677—REL—14 NR—EMBB URLLC MUX, 3rd Generation Partnership Project (3GPP), Mobile Competence Centre ; 650, Route DBS Lucioles ; F-06921 Sophia-Antipolis Cedex ; France, vol. RAN WG1, No. Spokane, USA; Jan. 16, 2017-Jan. 20, 2017 Jan. 16, 2017 (Jan. 16, 2017), XP051208201, Retrieved from the Internet: URL:http://www.3gpp.org/ftp/Meetings_3GPP_SY NC/RAN1/Docs/.

Qualcomm Incorporated: "DL URLLC/eMBB dynamic multiplexing and indication design", 3GPP Draft; R1-1702639 DL URLLCeMBB Dynamic Multiplexing and Indication Design, 3rd Generation Partnership Project (3GPP), Mobile Competence Centre ; 650, Route DBS Lucioles ; F-06921 Sophia-Antipolis, vol. RAN WG1, No. Athens, Greece; Feb. 13, 2017-Feb. 17, 2017 Feb. 12, 2017 (Feb. 12, 2017), XP051209790, Retrieved from the Internet: URL:http://www.3gpp.org/ftp/Meetings_3GPP_SY NC/RAN1/Docs/ [retrieved on Feb. 12, 2017].

Wilus Inc: "Indication on multiplexing between eMBB and URLLC in DL", 3GPP Draft; R1-1703030, 3rd Generation Partnership Project (3GPP), Mobile Competence Centre ; 650, Route Des Lucioles ; F-06921 SophiaAntipolis Cedex ; France, vol. RAN WG1, No. Athens, Greece; Feb. 13, 2017-Feb. 17, 2017 Feb. 12, 2017 (Feb. 12, 2017), XP051210170, Retrieved from the Internet: URL:http://www.3gpp.org/ftp/Meetings_3GPP_SY NC/RAN1/Docs/ [retrieved on Feb. 12, 2017].

SNR: "Discussion on eMBB and URLLC multiplexing",3GPP Draft; R1-1700281_Discussion on eMBB and URLLC Multiplexing, 3rd Generation Partnership Project (3GPP), Mobile Competence Centre ; 650, Route Des Lucioles ; F-06921 Sophia-Antipolis Cedex ; France, vol. RAN WG1, No. Spokane, USA; Jan. 16, 2017-Jan. 20, 2017 Jan. 16, 2017 (Jan. 16, 2017), XP051207819, Retrieved from the Internet: URL:http://www.3gpp.org/ftp/Meetings_3GPP_SY NC/RAN1/Docs/ [retrieved on Jan. 16, 2017].

Office Action dated Jan. 28, 2021 in counterpart Korean Patent Application No. 10-2017-0037798 and English-language translation.

Huawei et al., R1-1700022, On DL multiplexing of URLLC and eMBB transmissions, 3GPP TSG RAN WG1 #AH, Jan. 9, 2017 (12 pages).

Jung et al., U.S. Appl. No. 16/480,749, filed Jul. 25, 2019.

Decision of Patent dated Jul. 19, 2021 in counterpart Korean Application No. 10-2017-0037798 and English language translation.

Lenovo, "Overview on URLLC design and the coexistence with eMBB," 3GPP TSG RAN WG1 NR Ad-Hoc Meeting; R1-1700554 Spokane, US, Jan. 16, 2017-Jan. 20, 2017 (9 pages).

* cited by examiner ically high frequency band, beamforming, massive multiple-input and multiple-output (massive MIMO), full-dimensional MIMO (FD-MIMO), array antenna, analog beamforming, and large-scale antenna techniques are under discussion for a 5G communication system. Further, to improve the system network, technical development in an evolved small cell, an advanced small cell, a cloud Radio Access Network (cloud RAN), an ultra-dense network, device-to-device (D2D) communication, wireless backhaul, a moving network, cooperative communication, coordinated multi-points (CoMP), and reception interference cancellation is progressing for the 5G communication system. In addition, an advanced coding modulation (ACM) scheme including hybrid FSK and QAM modulation (FQAM) and sliding window superposition coding (SWSC), as well as advanced access techniques including filter bank multi-carrier (FBMC), non-orthogonal multiple access (NOMA), and sparse code multiple access (SCMA) are being developed for the 5G system.

METHOD AND APPARATUS FOR TRANSMITTING AND RECEIVING INFORMATION FOR PROVIDING PLURALITY OF COMMUNICATION SERVICES

CROSS REFERENCE TO RELATED APPLICATIONS

This application is a continuation of U.S. application Ser. No. 16/480,749, filed on Jul. 25, 2019, which is a national stage application of International Patent Application No. PCT/KR2018/003450, filed on Mar. 23, 2018, which designates the United States, which claims priority to Korean Patent Application 10-2017-0037798, filed on Mar. 24, 2017. The contents of each of these applications are incorporated herein in their entirety.

TECHNICAL FIELD

An embodiment of the disclosure relates to a method for transmitting and receiving information to provide a plurality of services via the same resource in a communication system and an apparatus using the same. More particularly, the disclosure relates to a method for transmitting and receiving configuration information and feedback information to provide a plurality of services via the same communication resource and an apparatus using the same.

BACKGROUND ART

In order to meet the demand for wireless data traffic, which has been increasing since the commercialization of a 4G communication system, efforts are being made to develop an improved 5G communication system or pre-5G communication system. For this reason, a 5G communication system or pre-5G communication system is referred to as a beyond-4G-network communication system or a post-LTE system. To achieve a high data transmission rate, implementation of a 5G communication system in an extremely high frequency (mmWave) band (for example, a 60 GHz band) is being considered. To reduce the path loss of radio signals and to increase the transmission distance of radio signals in an extremely high frequency band, beam-forming, massive multiple-input and multiple-output (massive MIMO), full-dimensional MIMO (FD-MIMO), array antenna, analog beamforming, and large-scale antenna techniques are under discussion for a 5G communication system. Further, to improve the system network, technical development in an evolved small cell, an advanced small cell, a cloud Radio Access Network (cloud RAN), an ultra-dense network, device-to-device (D2D) communication, wireless backhaul, a moving network, cooperative communication, coordinated multi-points (CoMP), and reception interference cancellation is progressing for the 5G communication system. In addition, an advanced coding modulation (ACM) scheme including hybrid FSK and QAM modulation (FQAM) and sliding window superposition coding (SWSC), as well as advanced access techniques including filter bank multi-carrier (FBMC), non-orthogonal multiple access (NOMA), and sparse code multiple access (SCMA) are being developed for the 5G system.

The Internet has evolved from a human-centered connection network, in which humans generate and consume information, into an Internet of Things (IoT) network, in which distributed components, such as objects, exchange and process information. Internet-of-everything (IoE) technology, in which big-data processing technology is combined with the IoT through connection with a cloud server and the like, has also emerged. As technological elements, such as sensing technology, wired/wireless communication and network infrastructure, service interface technology, and security technology are required to implement IoT, technologies for sensor networks, machine-to-machine (M2M) communication, and machine-type communication (MTC) have recently been studied with the goal of connecting objects. In an IoT environment, an intelligent Internet technology (IT) service that collects and analyzes data generated from connected objects may be provided to generate new value in human lives. The IoT is applicable to the fields of a smart home, a smart building, a smart city, a smart car or connected car, a smart grid, health care, a smart home appliance, advanced medical care services, and the like through convergence and integration of existing information technology with various industries.

Accordingly, various attempts are being made to apply a 5G communication system to the IoT network. For example, 5G communication technologies, such as a sensor network, M2M communication, and MTC, are implemented by beam-forming, MIMO, and array-antenna schemes. Applying a cloud radio access network (RAN) as the big-data processing technology described above is an example of the convergence of 5G technology and IoT technology.

In a communication system, a plurality of services may be provided to a user. To provide a plurality of services to a user, there is required a method for providing individual services in the same time period according to characteristics and for providing the plurality of services using the same time and frequency resources and a device using the same.

SUMMARY

Therefore, embodiments of the disclosure have been made in view of the above-mentioned problems, and an aspect of the disclosure is to provide a method and an apparatus for simultaneously providing different types of service. An embodiment of the disclosure is to provide a method of transmitting and receiving configuration information in order to receive different types of services within the same time interval by obtaining information received according to the characteristics of each service when the different types of services are provided at the same time and of transmitting and receiving feedback information in response to transmission of data about each service, and an apparatus using the same.

In view of the foregoing aspects, a communication method of a user equipment (UE) in a mobile communication system according to an embodiment of the disclosure includes: receiving first information associated with a resource allocation scheme for a first service and a second service from a base station; receiving control information associated with the first service from the base station; and receiving data about the first service from the base station on the basis of the control information and the first information.

A communication method of a base station in a mobile communication system according to another embodiment of the disclosure includes: transmitting first information associated with a resource allocation scheme for a first service and a second service to a UE; transmitting control information associated with the first service to the UE; and transmitting data about the first service to the UE on the basis of the control information and the first information.

A UE in a mobile communication system according to still another embodiment of the disclosure includes: a transceiver configured to transmit and receive a signal; and a controller configured to be connected with the transceiver, to receive first information associated with a resource allocation scheme for a first service and a second service from a base station, to receive control information associated with the first service from the base station, and to receive data about the first service from the base station on the basis of the control information and the first information.

A base station in a mobile communication system according to yet another embodiment of the disclosure includes: a transceiver configured to transmit and receive a signal; and a controller configured to be connected with the transceiver, to transmit first information associated with a resource allocation scheme for a first service and a second service to a UE, to transmit control information associated with the first service to the UE, and to transmit data about the first service to the UE on the basis of the control information and the first information.

According to an embodiment of the disclosure, it is possible to efficiently provide a plurality of services using the same time and frequency resources in a communication system, thereby enabling the efficient use of communication resources and improving the efficiency and reliability of each service.

DETAILED DESCRIPTION OF EXAMPLE EMBODIMENTS

Figure 1:
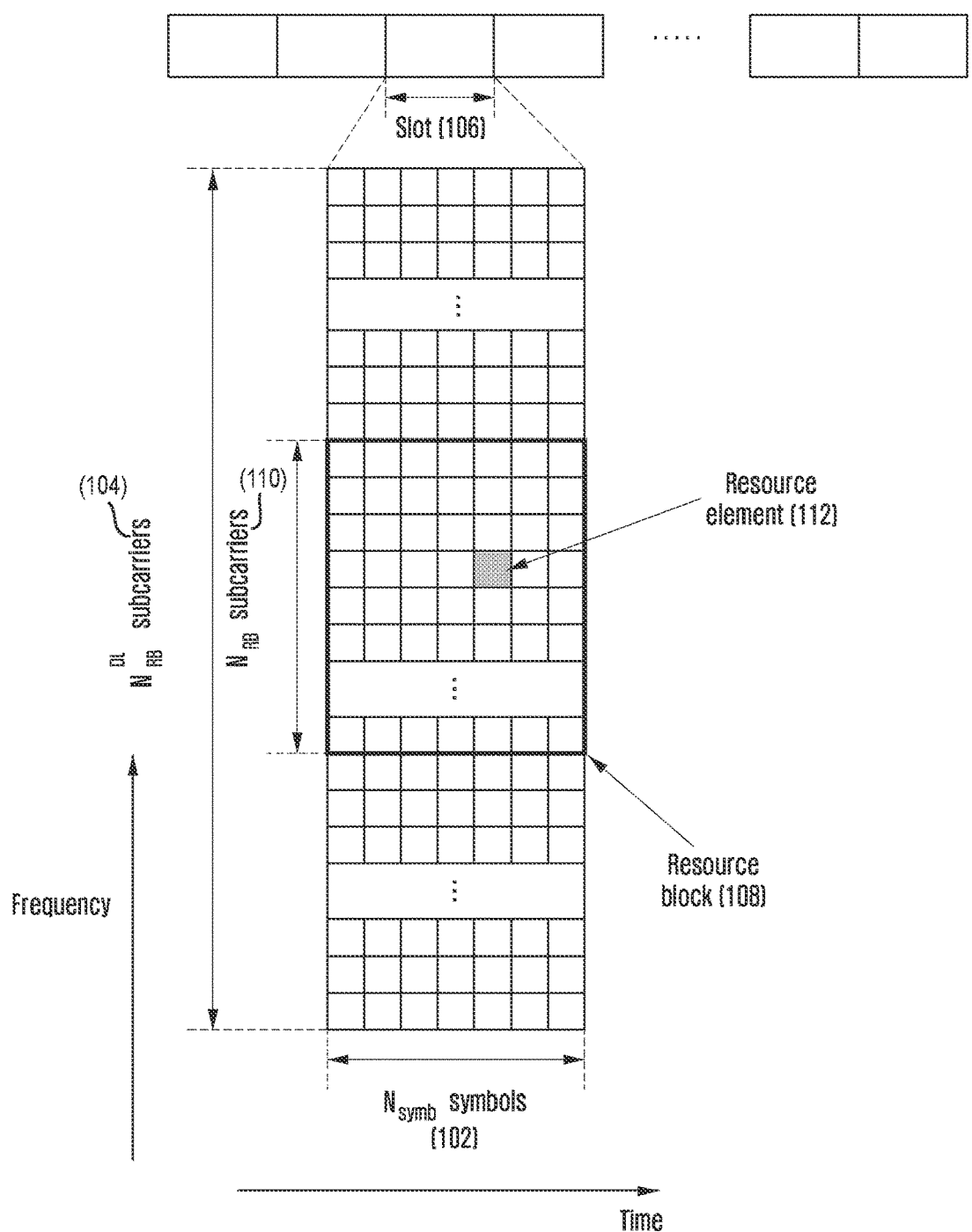
FIG. 1 illustrates time and frequency resources in a system to which an embodiment of the disclosure is applicable.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

FIG. 1 illustrates time and frequency resources in a system to which an embodiment of the disclosure is applicable.

Referring to FIG. 1, the horizontal axis represents the time domain and the vertical axis represents the frequency domain. The minimum transmission unit in the time domain is an OFDM symbol. $N_{symb}$ OFDM symbols 102 may form one slot 106, and a plurality of slots 106 may be included in 1 ms.

A basic unit of a resource in the time-frequency domain is a resource element (RE) 112, which may be represented by an OFDM symbol index and a subcarrier index. A resource block (RB) or a physical resource block (PRB) 108 may be defined by $N_{symb}$ consecutive OFDM symbols 102 in the time domain and $N_{RB}$ consecutive subcarriers 110 in the frequency domain. Thus, one RB 108 in one slot may include $N_{symb} \times N_{RB}$ REs 112. Generally, a minimum frequency-domain allocation unit for data is an RB. In the LTE system, $N_{symb}=7$ and $N_{RB}=12$ in general, and $N_{BW}$ and $N_{RB}$ may be proportional to the system transmission bandwidth. A data rate may increase in proportion to the number of RBs scheduled for a UE.

In an FDD system which operates a downlink and an uplink separately in different frequencies, the downlink transmission bandwidth and the uplink transmission bandwidth may be different from each other. According to one embodiment, in a time interval, some RBs may be used for an uplink, and some RBs may be used for a downlink.

A channel bandwidth represents an RF bandwidth corresponding to a system transmission bandwidth. Table 1 illustrates the relationship between system transmission bandwidth and channel bandwidth defined in the LTE system. For example, an LTE system with a 10 MHz channel bandwidth can have a transmission bandwidth of 50 RBs. Further, various numerologies may be configured in combination within one system. The embodiment to which the disclosure is applicable is not limited to the following table.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information may be transmitted within first N OFDM symbols in a subframe. In one embodiment, N={1, 2, 3} in general. Therefore, N may be variably applied in each subframe according to the amount of control information to be transmitted in the current subframe. The transmitted control information may include a control channel transmission interval indicator indicating the number of OFDM symbols through which the control information is transmitted, scheduling information about downlink data or uplink data, and HARQ ACK/NACK information.

In the LTE system, scheduling information about downlink data or uplink data is transmitted from a base station to a UE through downlink control information (DCI). DCI is defined according to various formats, and it is indicated according to each format whether DCI includes scheduling information (uplink (UL) grant) about uplink data or scheduling information (downlink (DL) grant) about downlink data, whether DCI is compact DCI having small-size control information, whether to apply spatial multiplexing using multiple antennas, and whether DCI is used for power control. For example, DCI format 1, which is scheduling control information (DL grant) about downlink data, may include at least one of the following pieces of control information.

Resource allocation type 0/1 flag: may indicate whether a resource allocation method is type 0 or type 1. Type 0 may allocate resources in resource block groups (RBGs) by applying a bitmap. In a communication system, for example, in an LTE system, a basic unit for scheduling may be an RB represented by time-frequency domain resources, and an RBG may include a plurality of RBs, and may be a basic unit for scheduling in type 0. Type 1 may allocate a specific RB in an RBG.

Resource block assignment: may indicate an RB allocated for data transmission. A represented resource may be determined according to the system bandwidth and the resource allocation method.

Modulation and coding scheme (MCS): may indicate a modulation scheme used for data transmission and the size of a transport block (TB) as data to be transmitted.

HARQ process number: may indicate an HARQ process number.

New data indicator: may indicate whether HARQ is initial transmission or retransmission.

Redundancy version: may indicate the redundancy version of HARQ.

Transmit power control (TPC) command for physical uplink control channel (PUCCH): may indicate a transmission power control command for a PUCCH as an uplink control channel.

The DCI may be transmitted on a physical downlink control channel (PDCCH) (interchangeable with control information) or an Enhanced PDCCH (interchangeable with enhanced control information), which is a physical downlink control channel, via channel coding and modulation.

In general, the DCI may be scrambled with a specific radio network temporary identifier (RNTI or a UE identifier) independently for each UE to be added with a cyclic redundancy check (CRC), may be channel-coded, and may be configured as an independent PDCCH to be transmitted. In the time domain, the PDCCH may be mapped and transmitted during the control channel transmission interval. The frequency-domain mapping position of the PDCCH may be determined by the identifier (ID) of each UE, and may be transmitted throughout the entire system transmission band. In one embodiment, at least one UE may form a group, and the same identifier may be allocated for the group, thereby transmitting a control signal to the group of the UE having obtained the identifier. This information may also be transmitted through at least one of a PDCCH or an EPDCCH.

Downlink data may be transmitted on a physical downlink shared channel (PDSCH), which is a physical channel for transmitting downlink data. The PDSCH may be transmitted after the control channel transmission interval, and scheduling information, such as a specific mapping position in the frequency domain and a modulation scheme, may be determined on the basis of the DCI transmitted through the PDCCH.

Through the MCS among the control information included in the DCI, a base station may notify a UE of the modulation scheme applied to the PDSCH to be transmitted and the transport block size (TBS) of the data to be transmitted. In one embodiment, the MCS may include five bits, or more or fewer than five bits. The TBS may correspond to the size of data (transport block: TB) to be transmitted by the base station to which channel coding for error correction is not yet applied.

Modulation schemes supported by the LTE system include quadrature phase shift keying (QPSK), 16-quadrature amplitude modulation (16QAM), and 64QAM, modulation orders ($Q_m$) of which may be 2, 4, and 6, respectively. That is, two bits per symbol may be transmitted in QPSK, four bits per symbol may be transmitted in 16QAM, and six bits per symbol may be transmitted in 64QAM. Further, 256QAM or higher modulation schemes may be used depending on system modifications.

A mobile communication system may provide a plurality of services. The plurality of services may include at least one of an enhanced mobile broadband (eMBB) service, an ultra-reliable and low-latency communications (URLLC) service, and a massive machine-type communications (mMTC) service. An existing LTE system receives only a scheduling resource for a base station, regardless of the service of a user device, and there is no division of a frame structure in a resource region. Therefore, in order to provide the plurality of services using the same resource, it may be necessary to divide a resource region, and there is a need to transmit and receive relevant information. Hereinafter, an eMBB service is referred to as a first-type service, and eMBB data is referred to as first-type data. The first-type service or the first-type data is not limited to eMBB but may be applicable to the case where high-speed data transmission is required or broadband transmission is performed. A URLLC service is referred to as a second-type service, and URLLC data is referred to as second-type data. The second-type service or the second-type data is not limited to URLLC but may be applicable to other systems where low latency is required or high-reliability transmission is required or where low latency and high reliability are required at the same time. An mMTC service is referred to as a third-type service, and mMTC data is referred to as third-type data. The third-type service or the third-type data is not limited to mMTC but may be applicable to the case where low speed, wide coverage, or low power is required. In describing an embodiment, the first-type service may be construed as including or not including the third-type service.

Further, with the improvement in communication systems, it is necessary to streamline feedback transmission and reception according to data transmission. In a conventional LTE system, data transmission is performed in transport block (TB) units. A TB may be divided into a plurality of code blocks (CBs), and channel coding may be performed in CB units. When retransmission is performed after initial transmission, retransmission is performed in TB units. In this case, even though only one CB fails to decode, an entire TB may be retransmitted. In order to improve transmission and reception performance, CB-based feedback transmission and retransmission may be required.

Figure 2:
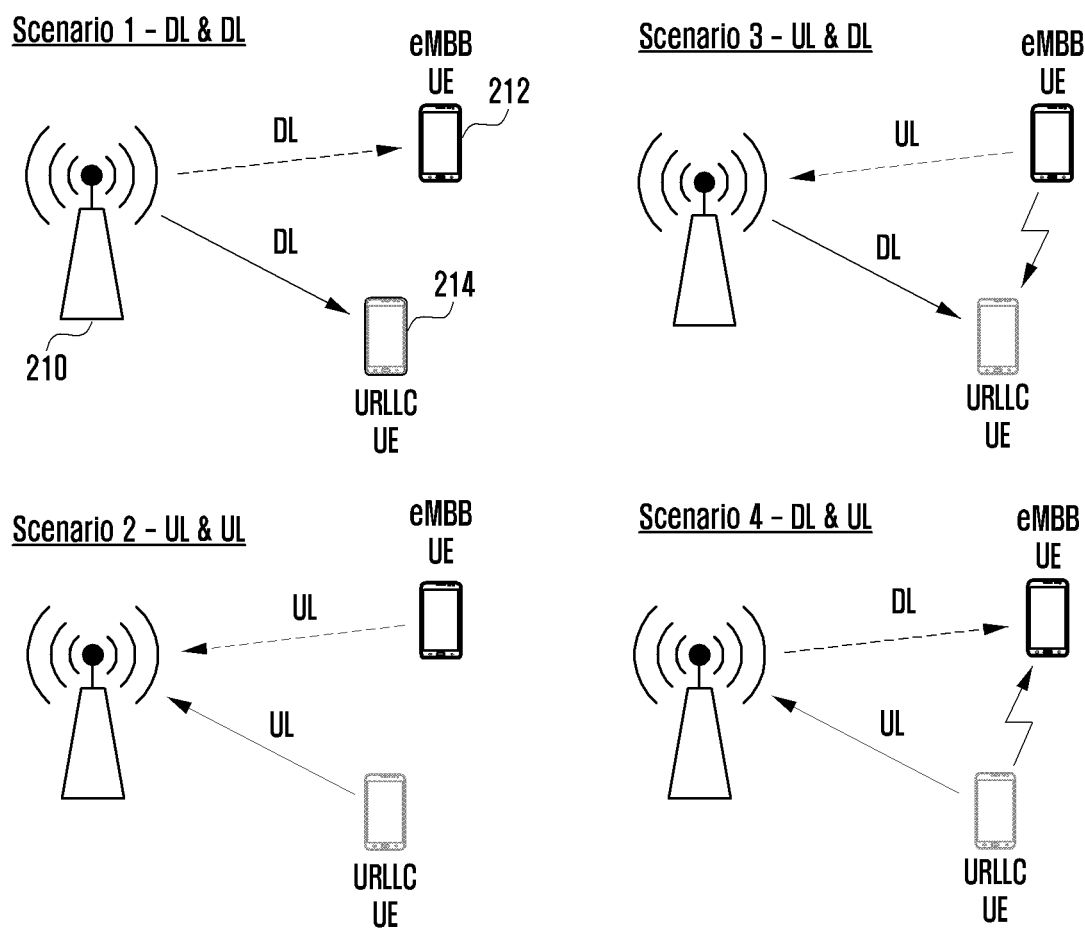
FIG. 2 illustrates a scenario between a UE receiving a plurality of services and a base station according to an embodiment of the disclosure.

FIG. 2 illustrates a scenario between a UE receiving a plurality of services and a base station according to an embodiment of the disclosure.

Referring to FIG. 2, a base station 210 may provide a plurality of services for UEs 212 and 214. The embodiment shows the case where eMBB and URLLC services are provided, but the disclosure is not limited thereto. Also, each service may be provided to a separate UE, as in an eMBB UE 212 and a URLLC UE 214, but a plurality of services may be simultaneously provided to the same UE.

In scenario 1, the base station 210 performs downlink transmission to each of the UEs 212 and 214. In this case, since resources for the URLLC UE 214 may be preferentially allocated, the eMBB UE 212 may not receive data in a corresponding resource region.

In scenario 2, each of the UEs 212 and 214 performs uplink transmission to the base station 210. In this case, since resources for the URLLC UE 214 may also be preferentially allocated, the eMBB UE 212 may not transmit data in a corresponding resource region.

In scenario 3, the base station 210 receives an uplink signal from the eMBB UE 212 and transmits a downlink signal to the URLLC UE 214. In this case, the downlink signal transmitted from the base station 210 to the URLLC UE 214 may cause interference in the eMBB UE 212, and the uplink signal transmitted from the eMBB UE 212 may cause interference in the URLLC UE 214.

In scenario 4, the base station 210 transmits a downlink signal to the eMBB UE 212 and receives an uplink signal from the URLLC UE 214. In this case, the downlink signal transmitted from the base station 210 to the eMBB UE 212 may cause interference in the URLLC UE 214, and the uplink signal transmitted by the URLLC UE 214 may cause interference in the eMBB UE 212.

There is a need for a method for providing a plurality of services via the same resource. In a communication system, a base station may statically, semi-statically, or dynamically allocate each resource in order to provide eMBB, URLLC, and mMTC services. Such scheduling may operate separately in a time domain or in a frequency domain. Further, resource regions for providing individual services may be mixed, and thus a method of providing services is described as follows. Embodiments are not limited to a description of providing eMBB and URLLC services, and the following description may similarly be applied to resource allocation for providing an mMTC service. In one embodiment, individual services may perform communication in bandwidths at least some of which overlap.

Figure 3:
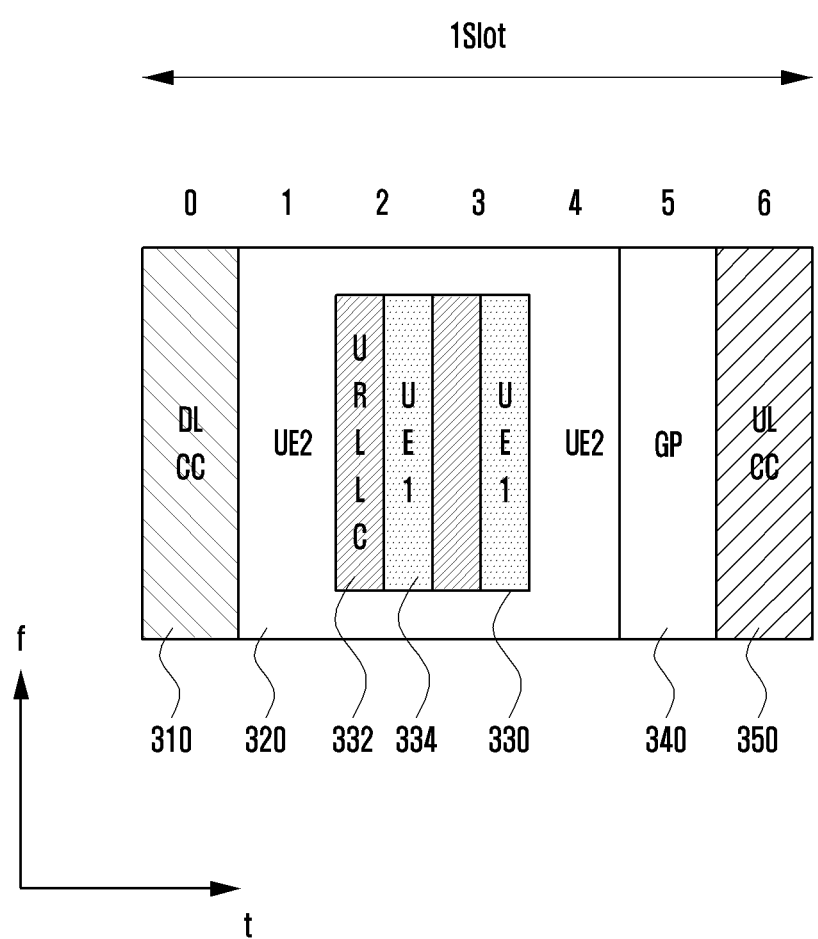
FIG. 3 illustrates a resource allocation method for providing a plurality of services in time and frequency resources according to an embodiment of the disclosure.

FIG. 3 illustrates a resource allocation method for providing a plurality of services in time and frequency resources according to an embodiment of the disclosure.

FIG. 3 shows one slot. One slot may include 14 symbols. In one embodiment, one slot may include 7 symbols.

According to one embodiment, symbol 0 310 may be allocated for downlink control channel transmission, symbols 1 to 4 320 may be allocated for downlink data transmission, symbol 5 340 may be used as a guide symbol for a switch to downlink uplink transmission, and symbol 6 350 may be allocated for uplink control channel transmission. In one embodiment, the downlink data transmission may include resources for UE 2 performing eMBB.

Here, a resource region 330 for providing a URLLC service may be allocated in symbols 1 to 4 320. This region may include a resource 332 for control channel transmission and a resource 334 for data channel transmission. Alternatively, the resource 332 for control channel transmission may be included in some of resources for a downlink control channel. The resource region 330 for providing the URLLC service may be dynamically allocated depending on whether a URLLC service is required. Specifically, when a resource is dynamically allocated for a URLLC service in eMBB resources, each resource may be allocated in a separate region, or may be allocated via multiplexing. More specifically, when a resource for providing a plurality of services is allocated via multiplexing in the same resources, the resource may be allocated by at least one of puncturing, preemption, and superposition. Here, the eMBB UE cannot receive data in a resource region punctured to provide a URLLC service. Here, if there is a large quantity of resources (TB(s), CB(s), or PRB(s)), the eMBB UE may fail in decoding. As a result, the eMBB UE needs to request retransmission from a base station and further needs to continuously provide resources associated with a buffer for performing an HARQ, which may reduce efficiency of resource utilization. According to one embodiment, in puncturing, information for URLLC may be transmitted in a region where data for eMBB transmission is transmitted, and information for an eMBB service may not be transmitted before puncturing. In preemption, data for providing an eMBB service may not be allocated in a region for transmitting information for URLLC, and the data for providing the eMBB service may be transmitted in the other resource region. In superposition, data for providing an eMBB service and information for URLLC transmission may be transmitted via multiplexing in a region for URLLC transmission.

In order to provide a plurality of services in the same resource region, it is necessary to determine a resource allocation method and to exchange information thereabout.

Figure 4:
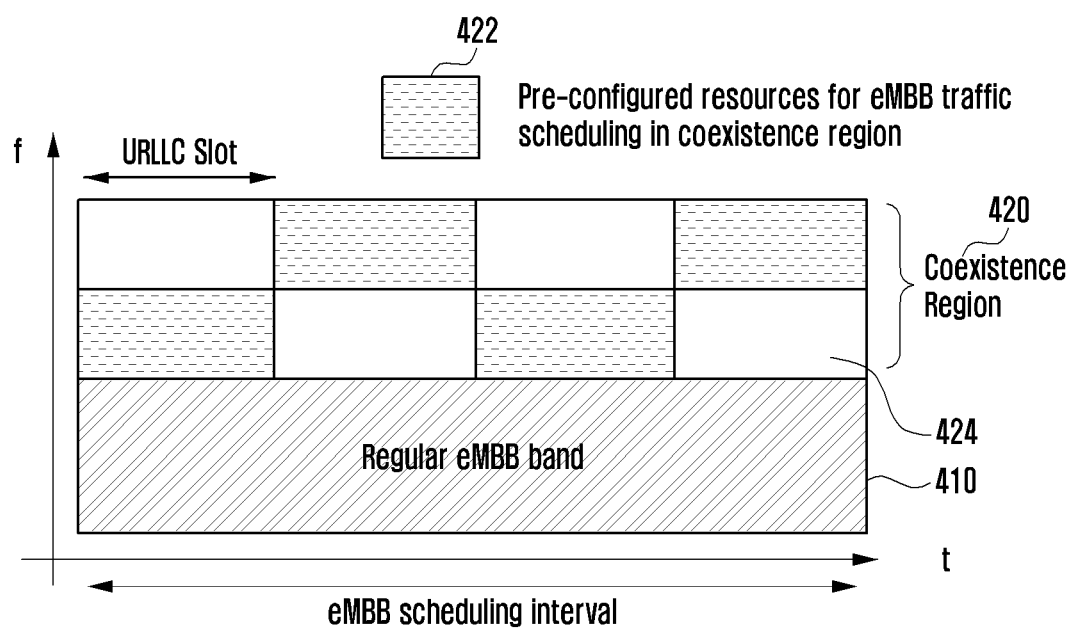
FIG. 4 illustrates a resource allocation method for a plurality of services according to an embodiment of the disclosure.

FIG. 4 illustrates a resource allocation method for a plurality of services according to an embodiment of the disclosure.

Referring to FIG. 4, frequency resources may include a first region 410 for providing an eMBB service and a second region 420 in which resources for an eMBB and URLLC may coexist. Specifically, resource allocation for an eMBB service may be performed in the first region 410, and the second region 420 may include a third region 422 for providing an eMBB service and a fourth region 424 in which resource allocation for a URLLC service may be performed. According to one embodiment, resource allocation for an eMBB service may be generally performed in the fourth region 424, and resources may be dynamically allocated in the region if it is required to provide a URLLC service.

However, the resource allocation type for providing a plurality of services is not limited to what is shown in the drawing. The second region 420 may be allocated in all frequency resources, or the second region 420 may be allocated only in part of a time region.

A base station may notify a UE that such regions exist by transmitting configuration information. The configuration information may allocate at least one of information indicating whether each region exists and information indicating a bandwidth if the region exists, and the base station may also transmit information indicating whether a resource for URLLC transmission is allocated in the fourth region to the UE. However, this information is not necessarily transmitted, and may be implicitly configured between the UE and the base station according to an embodiment. Specifically, the UE can also obtain information about the size of a URLLC resource region. Thus, the UE can obtain information about whether a resource for URLLC is allocated and information about an allocated resource region.

Figure 5:
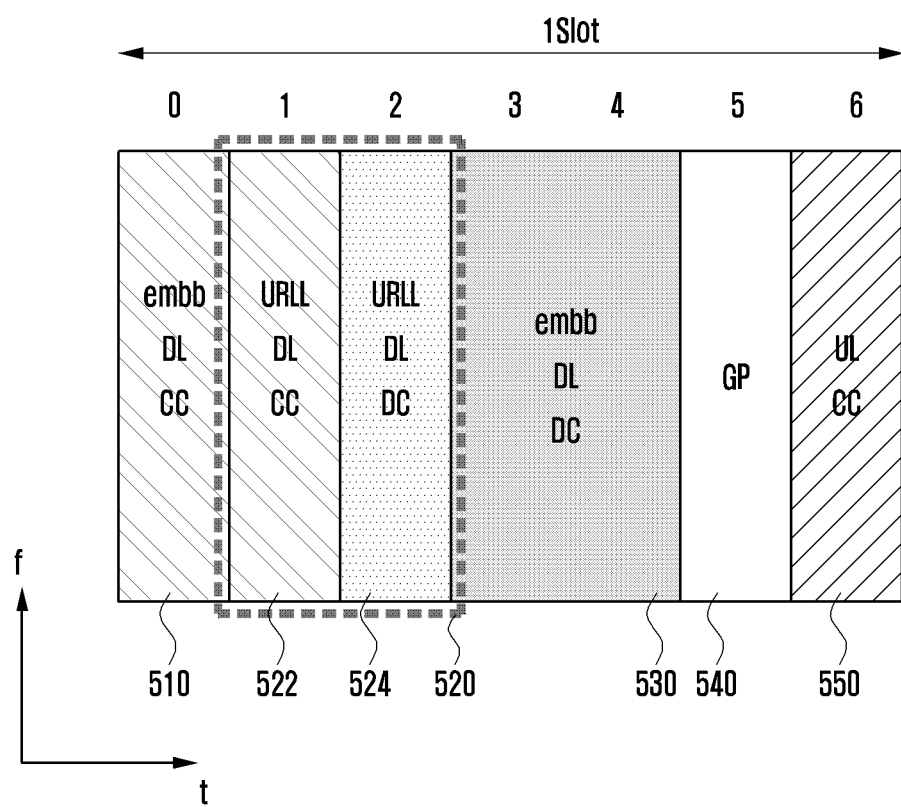
FIG. 5 illustrates a resource allocation method for a plurality of services according to another embodiment of the disclosure.

FIG. 5 illustrates a resource allocation method for a plurality of services according to another embodiment of the disclosure.

Referring to FIG. 5, one slot may include a total of seven symbols. The number of symbols may vary depending on the embodiment. In the embodiment, when a resource for URLLC is dynamically allocated, the resource for URLLC may be allocated by puncturing, preemption, or superposition in a part of a resource region for eMBB communication. In this case, numerology for an eMBB service and numerology for URLLC may be the same. Although the drawing shows that one entire symbol forms one slot for URLLC transmission in a TDM form, various combinations may exist. Also, in the embodiment, each subcarrier spacing is 30 kHz, and one slot includes seven symbols and 0.25 ms, which may vary depending on the embodiment.

Specifically, a first symbol 0 510 in the slot may be allocated for a downlink control channel for eMBB, and symbol 1-2 520 may be allocated for a resource for URLLC. More specifically, symbol 1 522 may be allocated for a control channel for URLLC, and symbol 2 524 may be allocated for a data channel for URLLC. Symbol 3-4 530 may be allocated for a downlink data channel for eMBB, symbol 5 540 may be allocated for a GP, and symbol 6 550 may be allocated for uplink control channel transmission.

In the embodiment, a resource region for URLLC may also be allocated in a region other than that indicated in the drawings on a time axis. Specifically, the resource region for URLLC may be allocated in any one of symbols 1 to 4 included in a data region for eMBB.

As described above, to provide services using URLLC and eMBB, at least one symbol, among symbols allocated for eMBB service transmission, may be allocated for a URLLC service. Further, in the embodiment, when a UE obtains information indicating that URLLC is allocated, the UE may determine that transmission for eMBB is not performed in a resource region for URLLC.

The embodiment has been described as including seven symbols, but is not limited thereto. Resources may be similarly configured in a structure including 14 symbols or more, and the quantity of resources for a corresponding channel may also be increased or reduced.

Figure 6:
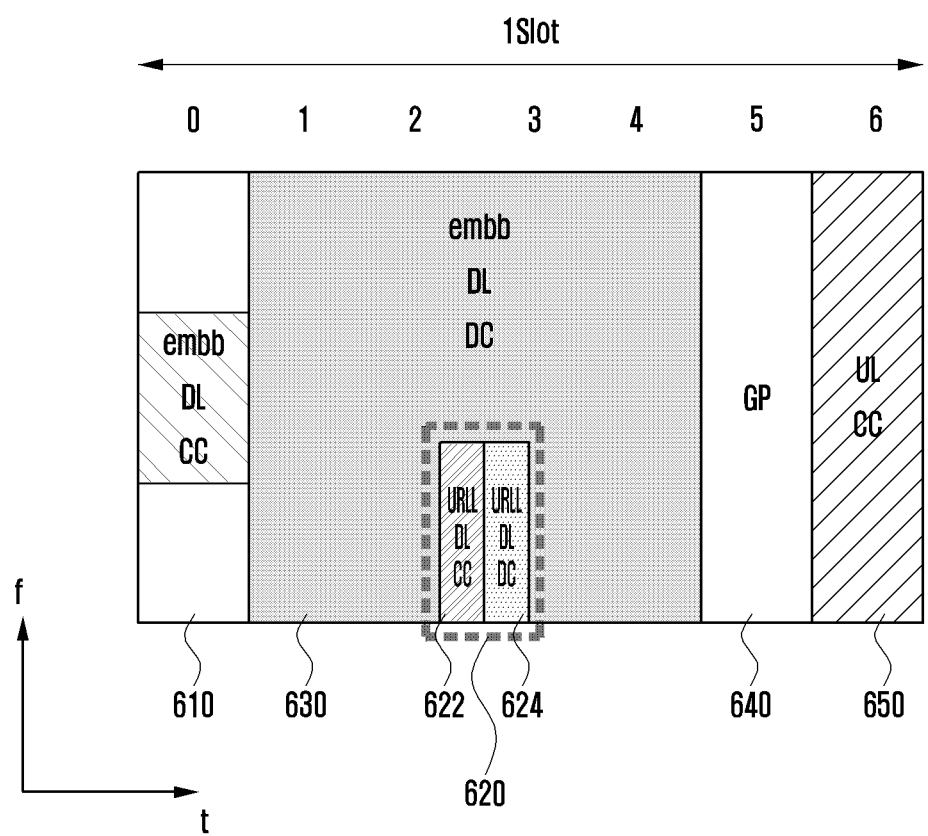
FIG. 6 illustrates a resource allocation method for a plurality of services according to still another embodiment of the disclosure.

FIG. 6 illustrates a resource allocation method for a plurality of services according to still another embodiment of the disclosure.

Referring to FIG. 6, one slot may include a total of seven symbols. The number of symbols may vary depending on the embodiment. In the embodiment, when a resource for URLLC is dynamically allocated, the resource for URLLC may be allocated by puncturing, preemption, or superposition in a part of a resource region for eMBB communication. In this case, numerology for an eMBB service and numerology for URLLC may be different. The drawing shows that a portion of one symbol forms a mini-slot for URLLC transmission in a TDM form, and the resource may include a plurality of PRBs in the embodiment. In addition, various combinations may exist. Also, in the embodiment, subcarrier spacing for eMBB is 30 kHz, subcarrier spacing for URLLC is 60 kHz, and one slot includes seven symbols and 0.25 ms, which may vary depending on the embodiment.

Specifically, symbol 0 610 may be allocated for a downlink control channel for eMBB. In the embodiment, the downlink control channel allocated to symbol 0 610 may be disposed in a portion of a resource region on a frequency, and the remaining portion of the resource region may be allocated for a downlink data channel, may be allocated for a resource for different communication, or may not be allocated for a resource. A resource for URLLC may be allocated in a portion 620 of symbol 3. More specifically, mini-symbol 1 622 may be allocated for a control channel for URLLC, and mini-symbol 2 624 may be allocated for a data channel for URLLC. Symbol 1-5 630 excluding the portion 620 may be allocated for a downlink data channel for eMBB, symbol 5 640 may be allocated for a GP, and symbol 6 650 may be allocated for uplink control channel transmission. In the embodiment, the portion 620 for a URLLC service may be disposed in a different position in the frequency domain or the time domain. More specifically, the portion 620 may be dynamically allocated to any position in a data region 630 for eMBB.

As described above, to provide services using URLLC and eMBB, at least one symbol among symbols allocated for eMBB service transmission may be allocated for a URLLC service.

In the embodiment, a resource region for URLLC may be dynamically allocated in a resource region allocated for eMBB. Specifically, when it is necessary to transmit information for providing a URLLC service, a base station may allocate a resource region for providing a URLLC service in a portion of a resource region allocated for eMBB. When performing such transmission, a UE receiving an eMBB service cannot receive information for receiving the eMBB service in the corresponding resource region due to the transmission of the information for providing the URLLC service. In this case, the base station may notify the UE that a resource for URLLC transmission is allocated in the resource region for eMBB through an indication. Specifically, the base station may notify the eMBB UE of information about puncturing, preemption, or superposition of a resource for providing a URLLC service in a particular resource region and of the type thereof, and the signal may be transmitted via a higher-layer signal including a control channel signal or an RRC signal. The eMBB UE may be notified that the resource for URLLC transmission is allocated before transmitting the information for providing the URLLC service, in the same slot, or in a next slot. In the following embodiments, such information is not limited to a description based on puncturing. Further, the eMBB UE may perform an operation, such as not performing decoding or waiting for retransmission, for eMBB data reception in a corresponding region where puncturing is performed through the indication, which will be described with reference to a specific embodiment.

Figure 7:
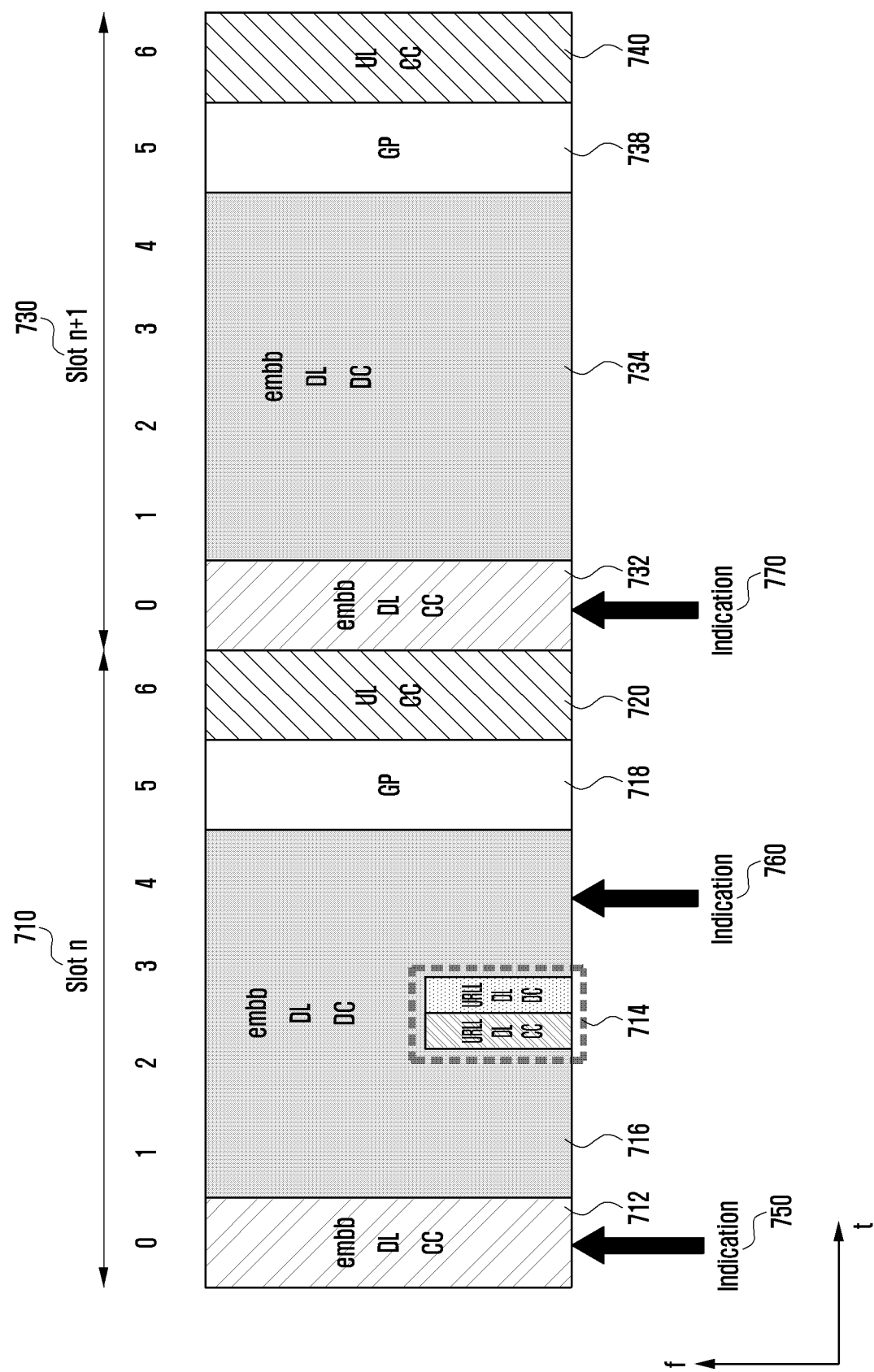
FIG. 7 illustrates an information transmission method for supporting a plurality of services according to an embodiment of the disclosure.

FIG. 7 illustrates an information transmission method for supporting a plurality of services according to an embodiment of the disclosure.

Referring to FIG. 7, resources for providing an eMBB service and a URLLC service may be allocated in consecutive slot n 710 and slot n+1 730.

A downlink control channel for providing an eMBB service may be transmitted via symbol 0 712 and 732 in each slot, and a downlink data channel for providing an eMBB service may be transmitted via symbols 1 to 4 716 and 734. Also, a gap may be allocated to symbol 5 718 and 738, and an uplink control channel may be allocated to symbol 6 720 and 740.

Further, a resource region 714 for transmitting information for providing a URLLC service may be allocated in symbols 1 to 4 716 of slot n 710. In the embodiment, a base station may notify a UE whether a resource region is allocated through an indication. In the embodiment, the indication may be transmitted to the UE via a control channel. Specifically, as indicated by reference numeral 740, it is possible to transmit information about whether a resource is allocated and about the resource allocation type through a control channel before resource allocation. Also, as indicated by reference numeral 750, it is possible to transmit information about whether a resource is allocated and about the resource allocation type through a data channel of the same slot. Further, as indicated by reference numeral 760, it is possible to transmit information about whether a resource is allocated and about the resource allocation type through a control channel of the next slot. A specific operating method is illustrated as follows.

As indicated by reference numeral 750, transmission of the indication before URLLC resource allocation may be referred to as pre-indication. The base station may transmit at least one of whether overlapping applies to a resource, whether puncturing applies to a resource, whether preemption applies to a resource, and whether superposition applies to a resource and information about an allocated resource to an eMBB UE. In the embodiment, the information may be transmitted via a signal using a control channel (new RAT PDCCH). In one embodiment, a channel for the signal may transmit the information through a downlink control channel disposed first in a corresponding slot (or subframe) so as to have a feature of pre-indication. In another embodiment, the indication signal may be particular RBs in a resource region allocated for the eMBB UE, more specifically a portion of an initial data or last data resource region configured in a resource region allocated for data transmission. In addition, depending on the embodiment, the information may be transmitted through a separate resource region to which frequency-division multiplexing applies.

As indicated by reference numeral 760, transmission of the information in a data region of the same slot may be referred to as on-transmission. The base station may transmit at least one of whether overlapping applies to a resource, whether puncturing applies to a resource, whether preemption applies to a resource, and whether superposition applies to a resource and information about an allocated resource to the eMBB UE through a portion of a resource region allocated for downlink data transmission to the eMBB UE. Specifically, the channel for the signal may transmit the information through some of data RB(s) allocated for the eMBB UE during transmission. In another embodiment, the information may be transmitted through a preset region of a resource region allocated for downlink data transmission in a corresponding slot (or subframe).

As indicated by reference numeral 770, transmission of the information in a data region of a slot following the slot in which a resource for URLLC is allocated may be referred to as post-indication. The base station may transmit at least one of whether overlapping applies to a resource, whether puncturing applies to a resource, whether preemption applies to a resource, and whether superposition applies to a resource and information about an allocated resource to the eMBB UE through a control channel of a subsequent slot. Specifically, the indication may be transmitted using a downlink control channel. In one embodiment, some resources (common search space or UE search space) of a PDCCH may be included. Further, in one embodiment, the information may be transmitted in a slot associated with retransmission of corresponding data after ACK/NACK feedback from the UE in response to the transmission by a gNB. Here, the information may be transmitted on a control channel (PDCCH) of the retransmission slot. This information may be commonly transmitted to eMBB UEs in a cell.

Specifically, the UEs in the cell may receive the information including the indication on the basis of a group identifier allocated to eMBB UEs.

The information may also include an HARQ ID, indication information, an NDI, an RV, or the like in a UE-specific DCI format. Specifically, the method for indicating the information may vary depending on the number of bits of information.

1) One bit: This information may indicate whether puncturing is performed due to URLLC in the previous transmission of a corresponding HARQ.

2) Two bits or more: This information may indicate whether puncturing is performed due to URLLC in a previous transmission of a corresponding HARQ and a CB(s) in which puncturing is performed.

Further, when indication information of two bits or more is used, it is possible to indicate at least one CB in which puncturing is performed, and it is also possible to indicate a set of such CBs to a UE.

In another embodiment, the signal may be transmitted before ACK/NACK feedback from the UE in response to the transmission by the gNB. That is, the signal may be transmitted in a slot (N+1th) immediately after a slot (Nth) in which data transmission of eMBB, punctured due to URLLC, is performed or in a subsequent slot. If the signal is transmitted in the subsequent slot, information indicating transmission in the subsequent slot may also be transmitted. Specifically, it may be indicated whether puncturing is performed in the previous slot due to URLLC using a common DCI format. More specifically, the method for indicating the information may vary depending on the number of bits of information. Further, this information may be transmitted to a particular UE or may be commonly transmitted to a group of UEs.

1) One bit: This information may indicate whether puncturing is performed due to URLLC in a previous transmission (N−1th slot) of a corresponding HARQ (Nth slot).

2) Two bits: This information may indicate whether puncturing is performed due to URLLC in previous transmissions (N−1th, N−2th, N−3th, and N−4th slots) of a corresponding HARQ (Nth slot).

It is possible to indicate a CB(s) in which puncturing is performed according to the number of bits indicated, and a mapping relationship may be transmitted via preset information or separate signaling.

Further, according to the embodiment, it is possible to indicate an HARQ ID, indication information, an NDI, an RV, or the like in a UE-specific DCI format.

1) One bit: This information may indicate whether puncturing is performed due to URLLC in a previous transmission of a corresponding HARQ.

2) Two bits: This information may indicate a CB(s) in which puncturing is performed due to URLLC in a previous transmission of a corresponding HARQ.

According to the embodiment, in order to effectively provide different types of services, it is necessary to simplify a retransmission procedure in response to decoding failure. Specifically, it is possible to reduce a delay in transmission time or to efficiently utilize at least one of frequency-time and spatial resources, and it is necessary to reduce the usage of an HARQ buffer memory of a UE using additional base station signaling before transmitting an HARQ ACK/NACK message.

Figure 8:
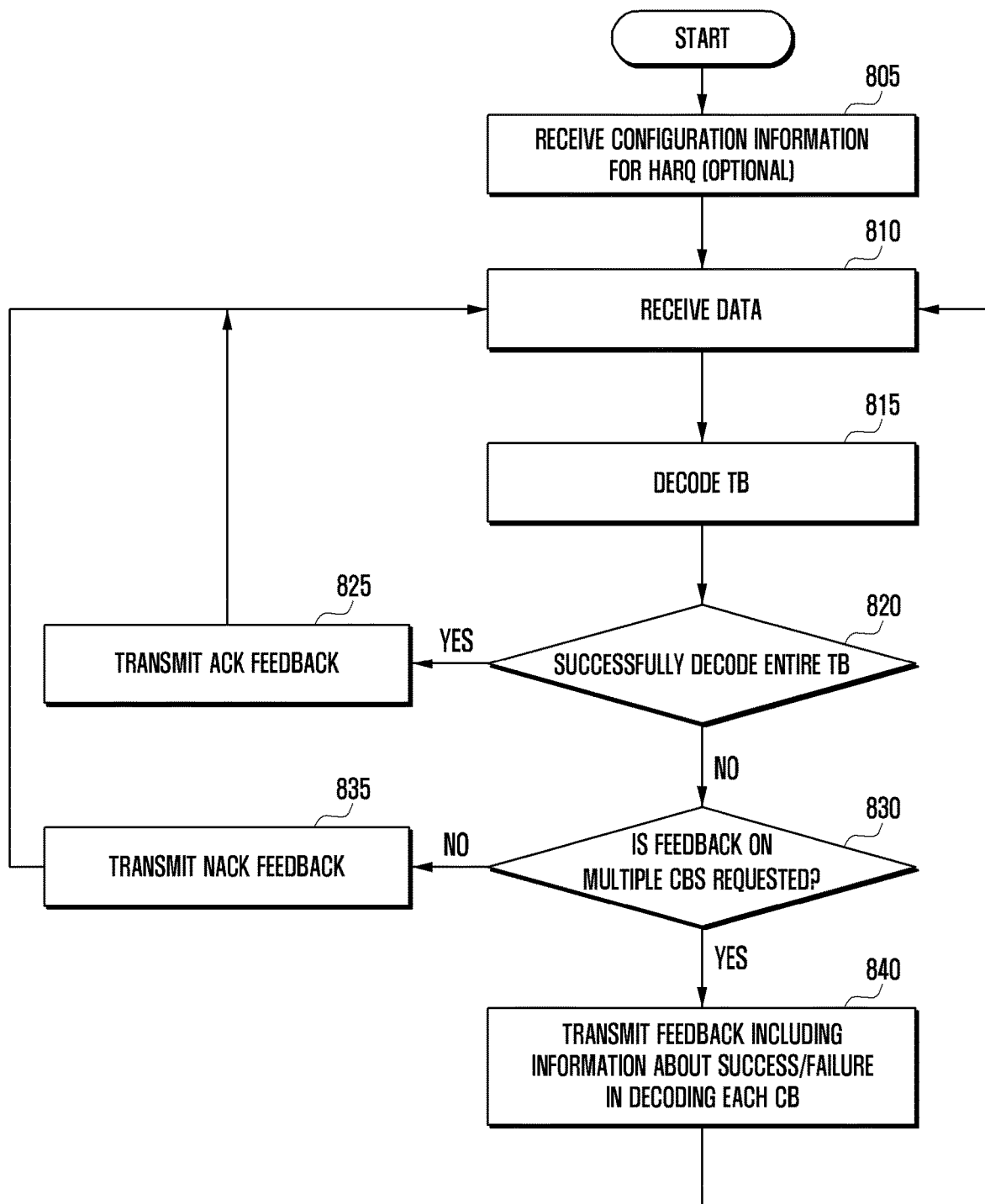
FIG. 8 illustrates a feedback information transmission method for supporting a plurality of services according to an embodiment of the disclosure.

FIG. 8 illustrates a feedback information transmission method for supporting a plurality of services according to an embodiment of the disclosure.

Referring to FIG. 8, a base station may transmit data to a UE and may receive HARQ feedback information in response.

In operation 805, the base station may transmit configuration information for an HARQ to the UE. This operation may be optionally performed and may not be essential. The configuration information for the HARQ may include information indicating the method of performing feedback on transmitted data. Specifically, the base station may configure information about whether to perform TB-based feedback or CB-based feedback on data transmitted to the UE. The configuration information may also be obtained by exchanging bit information allocated for HARQ feedback.

In operation 810, the UE may receive data from the base station. The data may include at least one TB, and the TB may include at least one CB.

In operation 815, the UE may decode the received TB. Specifically, the UE may decode the at least one CB included in the TB and may thus decode all CBs included in the TB. If necessary, the UE may decode only the TB. This configuration may be determined through explicit signaling between the base station and the UE, or may also be implicitly determined.

In operation 820, the UE may determine whether the entire TB is successfully decoded. Specifically, the UE may determine whether all the CBs included in the TB are successfully decoded. If decoding is successful, the UE may transmit an ACK feedback to the base station in operation 825.

In operation 830 for all the CBs, the UE may determine whether feedback on a plurality of CBs is requested from the base station. The request for the feedback on the plurality of CBs may be transmitted via higher-layer signaling or physical-layer signaling. Here, if the feedback on the plurality of CBs is not requested, the UE may transmit NACK feedback in operation 835. Specifically, even though one bit is allocated for the HARQ in the configuration information for the HARQ, if decoding of at least one CB fails, the UE may transmit NACK feedback.

If feedback on the plurality of CBs is requested from the base station, the UE may transmit information about success or failure in decoding each CB to the base station. Specifically, the UE may transmit information about a CB successfully decoded or a CB decoding of which failed to the base station, and the base station may perform retransmission on the basis of the information.

According to the embodiment, one TB may include a plurality of CBs, and each CB may include CRC bits. If one CB fails, the entire TB fails to be decoded, and thus the UE may transmit an HARQ NACK.

Further, as described above, HARQ ACK/NACK feedback may be performed on the basis of one CB or a plurality of CBs. Specifically, one TB may include a plurality of CBs, and each CB may include CRC bits. Here, as described above, an HARQ NACK may be configured using a plurality of bits, and information about a CB(s) that has failed to be decoded or has been successfully decoded may be transmitted to the base station. In one embodiment, if the number of bits for an HARQ NACK is 2, $2^2$ types of HARQ NACKs may be indicated. For example, if one slot includes seven symbols, symbol 0 as a first symbol is configured for downlink control, symbol 6 is configured for uplink control, and symbol 5 is configured for a gap, symbols 1, 2, 3, and 4 may be allocated for a downlink data region. In this case, if at least one of CB1 and CB2 fails, 01 may be transmitted; if at least one of CB3 and CB4 fails, 10 may be transmitted. 00 may indicate the failure of all CBs, and 11 may indicate the success of all CBs. In this embodiment using two bits, the mapping sequence and relationship of a CB(s) to the bits may be similar or extended. According to one embodiment, information of two bits or more may be allocated to transmit feedback information about a CB. In addition, according to one embodiment, it is possible to indicate ACK/NACK of information corresponding to a mapped physical resource. Specifically, the UE may transmit ACK/NACK of all CBs transmitted in a particular resource region to the base station. According to another embodiment, it is possible to transmit only a number corresponding to a failed CB using an NACK message. As such, HARQ feedback on data transmission may be performed in CB units, thereby efficiently utilizing resources.

When a resource is allocated, a UE receiving an eMBB service may perform different operations depending on the resource allocation method for a URLLC service and whether a resource is allocated. Specifically, with the resource allocated, the UE receiving the eMBB service may receive information about whether puncturing, preemption, or superposition applies to the resource through a control channel signal or a radio resource control (RRC) control signal of a base station. Here, the control channel signal may be downlink control information present first in a corresponding slot (or subframe). The RRC signal may be transmitted semi-statically or statically to the UE through a data channel. Here, as shown in FIG. 5 or 6, if the UE is allocated an overlapping resource, the UE needs to be able to perform decoding excluding a punctured resource. In this case, success or failure in decoding may be determined on the basis of the quantity of punctured resources. That is, if there are a small number of resources punctured due to URLLC, it is possible to recover eMBB data using an error recovery scheme. The error recovery scheme may include a CRC checkup. When relevant information is transmitted as indicated by 760 and 770 of FIG. 7, a control channel transmitted by the base station may be transmitted to the UE before an ACK/NACK transmitted from the UE to the base station is transmitted. This situation may proceed, for example, when there are a great number of PRB(s) of punctured or preempted resources among resources allocated to the eMBB UE in a previous slot and the gNB determines that failure obviously occurs.

In another embodiment, when an ACK/NACK is considered after explicit signaling of zero (for a UE supporting a self-contained structure), one, or two slots, as in a new RAT system, it is necessary to reduce HARQ IDs and memories, rather than using a large number of HARQ IDs and memories, in view of management of HARQ process IDs. In this assumption, the base station may autonomously determine efforts to reduce HARQ processes and may perform retransmission as quickly as possible, thus expecting an improvement in HARQ process operation and throughput.

Here, UE types may be basically classified as follows.

1) UE Supporting Non-Self-Contained Structure

The base station may transmit HARQ ACK/NACK transmission timing (slot number or time) for the UE via DCI through a PDCCH.

2) UE Supporting Self-Contained Structure

Basically, this UE refers to a UE capable of processing data in a corresponding slot and transmitting an HARQ ACK/NACK via corresponding uplink control or data.

Hereinafter, a feedback transmission method will be described with reference to embodiments.

Figure 9:
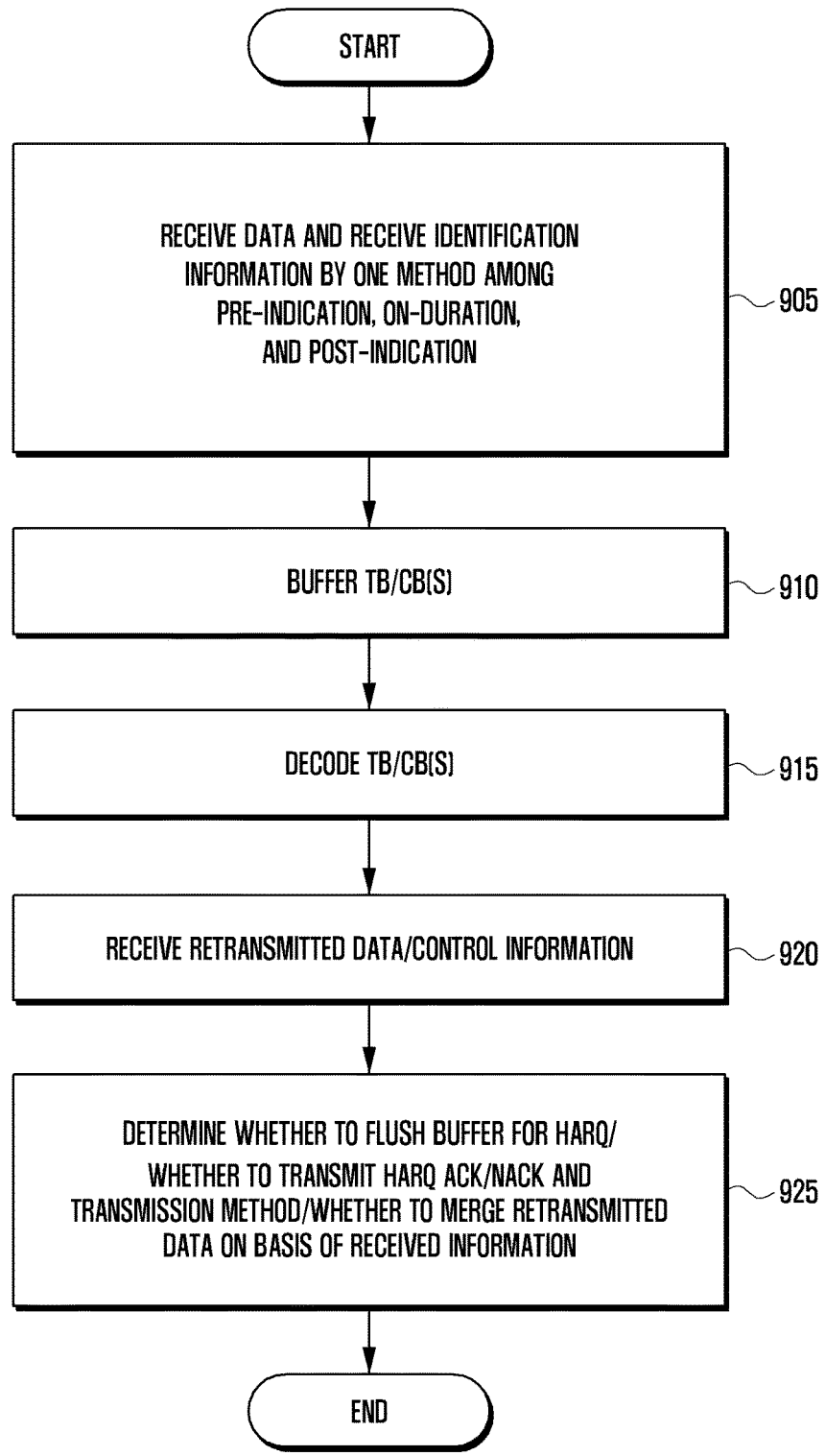
FIG. 9 illustrates the operation of a UE generating feedback information for supporting a plurality of services according to an embodiment of the disclosure.

FIG. 9 illustrates the operation of a UE generating feedback information for supporting a plurality of services according to an embodiment of the disclosure.

Referring to FIG. 9, a UE may transmit and receive a signal to and from a base station. Specifically, in the embodiment, the UE is a UE for receiving an eMBB service, and the base station may provide an eMBB service and a URLLC service.

In operation 905, the UE may receive data about an eMBB service and identification information about resource allocation for a URLLC service from the base station. In the embodiment, the identification information may be received on the basis of at least one of pre-indication, on-duration, and post-indication, described above. In the embodiment, the identification information may include at least one of whether a resource is allocated for providing a URLLC service and the resource allocation type.

In operation 910, the UE may buffer a TB for data reception on the basis of the received information. The TB may include at least one CB. In the embodiment, at least one CB may be referred to as a CB group, and it may be possible to determine whether transmission is successful and to perform an HARQ on the basis of the CB group.

In operation 915, the UE may decode the buffered TB on the basis of the received information. As mentioned in the previous embodiment, decoding may be performed on the basis of CB. If there is a high possibility of failure in decoding based on at least one piece of the information received in operation 905, the UE may not perform decoding. Specifically, when a large proportion of resources is punctured for providing a URLLC service, decoding is highly likely to fail, and thus the UE may wait rather than perform decoding. Alternatively, the UE may not autonomously store, but may discard the buffered TB or some CBs.

In operation 920, the UE may receive control information for scheduling the data and data relevant thereto from the base station. Specifically, the data for providing the eMBB service, which may be transmitted in a resource region punctured for providing a URLLC service, may be retransmitted, and the control information for scheduling the data may include at least one of information about whether merging decoding is performed on the received retransmitted data, information about ACK/NACK timing, an HARQ ID, and PUCCH resource information for ACK/NACK transmission.

In operation 925, the UE may determine whether to flush buffered data on the basis of the received information. Further, the UE may determine whether to transmit an HARQ ACK/NACK and a transmission method. Also, the UE may determine whether to merge the received retransmitted data.

Figure 10:
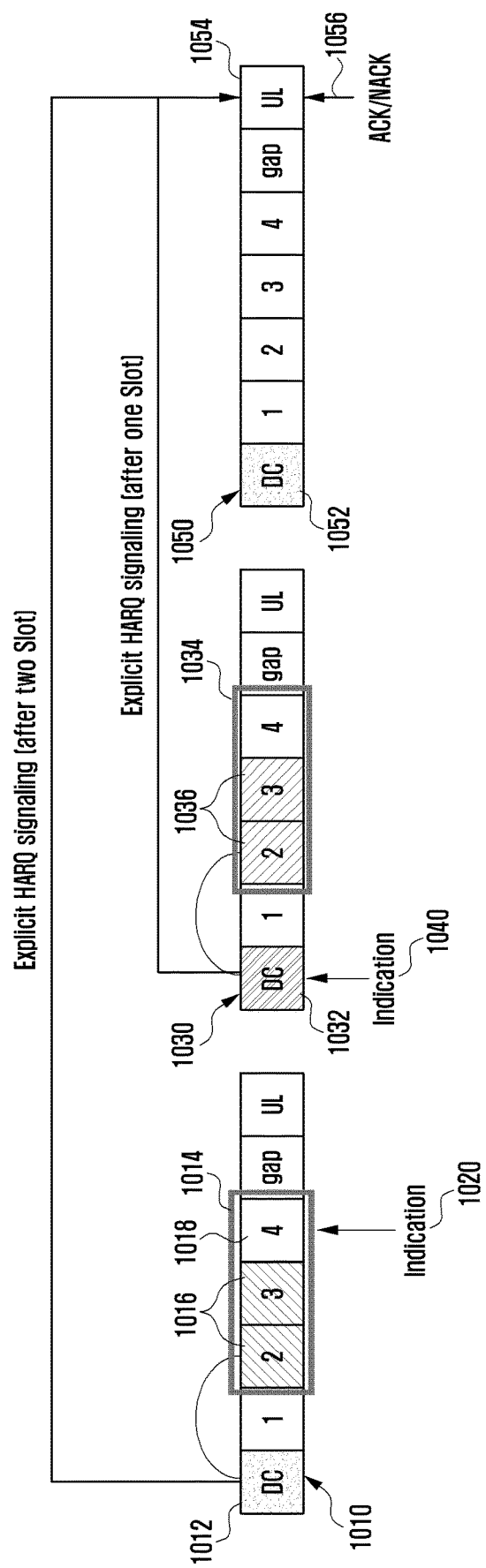
FIG. 10 illustrates a method of transmitting and receiving feedback information for supporting a plurality of services according to an embodiment of the disclosure.

FIG. 10 illustrates a method of transmitting and receiving feedback information for supporting a plurality of services according to an embodiment of the disclosure.

Referring to FIG. 10, a base station may transmit downlink data scheduling information and ACK/NACK timing information related thereto through a downlink control channel of a first slot. In the embodiment, an ACK/NACK timing may be an uplink control channel 1054 after two slots.

In addition, a resource for a URLLC service may be allocated in symbols 2 and 3 1016 of the first slot. Information about this resource allocation may be transmitted to a UE by at least one of pre-indication, on-duration, and post-indication illustrated in the above embodiments. For example, the information may be transmitted at a timing indicated by reference numeral 1020 according to on-duration, while the information may be transmitted to the UE at a timing indicated by reference numeral 1040 according to post-indication.

In this case, a UE receiving an eMBB service cannot receive data via symbols 2 and 3 1016 and may determine whether to perform decoding on the basis of data received through symbol 4 1018. According to the embodiment, the UE may transmit an ACK/NACK in CB units and may wait for retransmission.

The UE receiving identification information through reference numeral 1020 or 1040 may perform at least one of retransmission reception and feedback transmission on the basis of the identification information.

The UE may receive data, which the UE has failed to receive due to puncturing in the previous operation, through symbols 2 and 3 1036 of a second slot, and may perform decoding on the basis of the data. Subsequently, the UE may transmit an ACK/NACK 1056 according to the decoding result at the timing of the ACK/NACK 1056 through an uplink control channel of symbol 6 1054 of a third slot.

In the embodiment, when the UE is scheduled to transmit an explicit HARQ signal in an n+2th slot, the base station and the UE may operate as follows.

First, when a certain number of CBs or RBs are punctured, the base station may perform corresponding retransmission immediately at the time when reallocation is possible (the next slot in the embodiment) rather than waiting for the HARQ timing of the UE. Here, the foregoing indication may be used to indicate whether puncturing applies. Data packets immediately retransmitted may overlap an ACK/NACK transmission timing scheduled in a previous transmission. In one embodiment, the slot may be included in an uplink resource for supporting like coverage.

Here, the foregoing indication may be used to indicate whether puncturing applies, and an HARQ ID and a PUCCH resource according to the operation of the base station may be configured as follows.

1. The base station may perform data transmission to the UE in a first slot by allocating HARQ ID #0 and allocation HARQ PUCCH resource #0 and may perform data transmission in a second slot including retransmission by repeatedly allocating HARQ ID #0 and allocation HARQ PUCCH resource #0. In this case, once only an NDI is toggled without any indication, the UE may flush a buffer associated with data received in the first slot and may perform decoding in response to the retransmission. Further, the foregoing indication may transmit the HARQ ID and the PUCCH resource. The indication may be common DCI or UE-specific DCI.

2. The base station may perform first transmission to the UE using HARQ ID #0 and allocation HARQ PUCCH resource #0 and may perform second transmission including retransmission by differently allocating HARQ ID #0 and allocation HARQ PUCCH resource #1. In this case, the UE may transmit the decoding result in response to the retransmission through PUCCH resource #1 and may transmit a feedback result through a resource selected from among #0 or #1 on the basis of the decoding result.

According to the UE operation, the UE may identify failure of reception in symbols 2 and 3 1016 of the first slot and may perform CB-based combination of retransmitted data on the basis of a subsequently received indication, thereby obtaining additional gain. Particularly, to fit a long PUCCH timing (slot n+2) for HARQ feedback transmission to a cell-edge UE, the following conditions may be considered.

1. Bundling ACK/NACK in One PUCCH Resource (Latest Allocated)

Upon receiving the first control channel transmission (HARQ ID=#0, allocation HARQ PUCCH resource #0) from the base station and the second transmission (HARQ ID=#0, allocation HARQ PUCCH resource #0) including the retransmission, the UE may decode received information and may transmit an ACK/NACK message pertaining to whether decoding is successful. When a resource allocated for feedback is one bit, an ACK/NACK pertaining to whether decoding is successful may be transmitted. When the resource is two bits or more, an ACK/NACK may be transmitted in CB units or a set of CBs. PUCCH resource allocation may be performed implicitly or explicitly.

2. Multiplexing

Upon receiving the first control channel transmission (HARQ ID=#0, allocation HARQ PUCCH resource #0) from the base station and the second transmission (HARQ ID=#0, allocation HARQ PUCCH resource #1) including the retransmission, the UE may decode received information and may transmit an ACK/NACK message pertaining to whether decoding is successful. When each allocated resource is one bit, it is possible to support two-bit multiple feedback by combining feedback information in each PUCCH resource. PUCCH resource allocation may be performed implicitly or explicitly.

3. Channel Selection

Upon receiving the first control channel transmission (HARQ ID=#0, allocation HARQ PUCCH resource #0) from the base station and the second transmission (HARQ ID=#0, allocation HARQ PUCCH resource #1) including the retransmission, the UE may decode received information and may transmit an ACK/NACK message pertaining to whether decoding is successful. When each allocated resource is one bit, the UE may transmit an ACK/NACK selectively using each resource. Here, the UE may select the resource allocated for the second transmission. In addition, the UE may transmit an ACK/NACK through the selected resource in accordance with the decoding result according to a preset rule.

Figure 11:
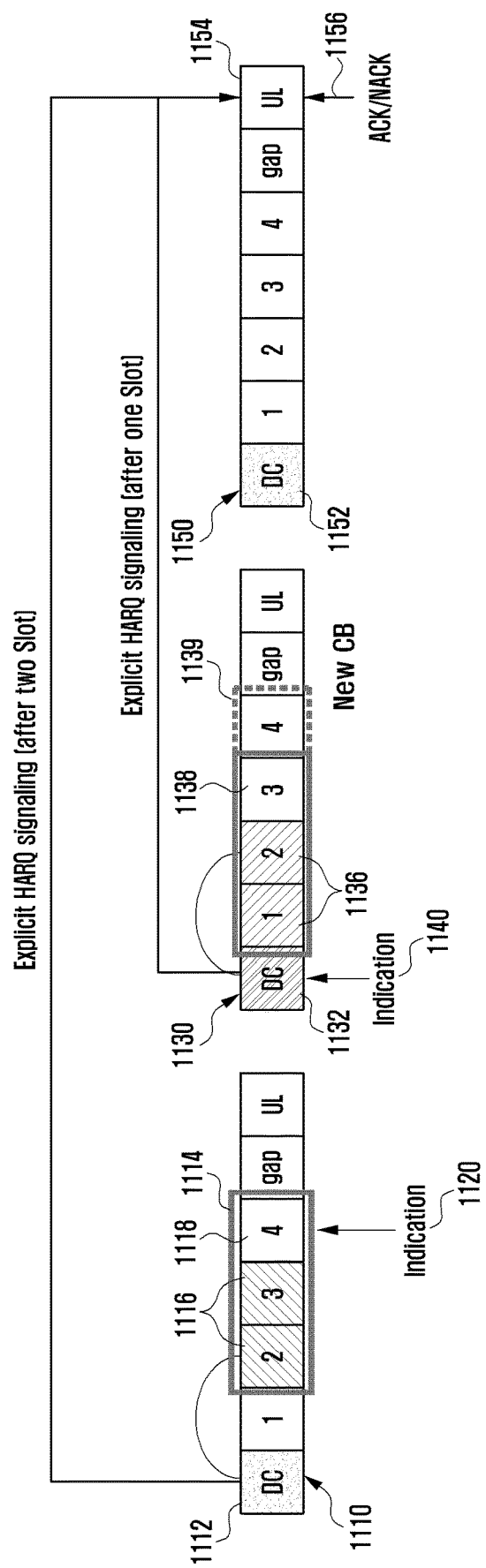
FIG. 11 illustrates a method of transmitting and receiving feedback information for supporting a plurality of services according to another embodiment of the disclosure.

FIG. 11 illustrates a method of transmitting and receiving feedback information for supporting a plurality of services according to another embodiment of the disclosure.

Referring to FIG. 11, a base station may transmit downlink data scheduling information and ACK/NACK timing information related thereto through a downlink control channel of a first slot. In the embodiment, an ACK/NACK timing may be an uplink control channel 1154 after two slots.

In addition, a resource for a URLLC service may be allocated in symbols 2 and 3 1116 of the first slot. Information about this resource allocation may be transmitted to a UE through reference numeral 1120 or 1140. In this case, a UE receiving an eMBB service cannot receive data via symbols 2 and 3 1116 and may determine whether to perform decoding on the basis of data received through symbol 4 1118. According to the embodiment, the UE may transmit an ACK/NACK in CB units and may wait for retransmission.

The UE receiving identification information through reference numeral 1120 or 1140 may perform at least one of retransmission reception and feedback transmission on the basis of the identification information.

The UE may receive data, which the UE failed to receive due to puncturing in the previous operation, through symbols 1 and 2 1136 of a second slot, and may receive additionally allocated data through symbol 4 1139. The UE may perform decoding on the basis of retransmitted data. Subsequently, the UE may transmit an ACK/NACK 1156 according to the decoding result at the timing of the ACK/NACK 1056 through an uplink control channel of symbol 6 1154 of a third slot.

In the embodiment, when the UE is scheduled to transmit an explicit HARQ signal in an n+2th slot, the base station and the UE may operate as follows.

First, when a certain number or greater of CBs or RBs are punctured, the base station may perform corresponding retransmission immediately at the time when reallocation is possible (the next slot in the embodiment) rather than waiting for the HARQ timing of the UE. Here, the foregoing indication may be used to indicate whether puncturing applies. Immediately retransmitted data packets may overlap an ACK/NACK transmission timing scheduled in a previous transmission. In one embodiment, the slot may be included in an uplink resource for supporting like coverage.

Here, the foregoing indication may be used to indicate whether puncturing applies, and an HARQ ID and a PUCCH resource according to the operation of the base station may be configured as follows.

1. The base station may perform first transmission to the UE using HARQ ID #0 and allocation HARQ PUCCH resource #0 and may perform second transmission including retransmission using HARQ ID #0, allocation HARQ PUCCH resource #0, HARQ ID #1, and allocation HARQ PUCCH resource #0. Further, the foregoing indication may transmit the HARQ ID and the PUCCH resource. The indication may be common DCI or UE-specific DCI.

2. The base station may perform first transmission to the UE using HARQ ID #0 and allocation HARQ PUCCH resource #0 and may perform second transmission including retransmission by differently allocating HARQ ID #0, allocation HARQ PUCCH resource #0, HARQ ID #1, and allocation HARQ PUCCH resource #1. The indication may be common DCI or UE-specific DCI.

According to the UE operation, the UE may identify failure of reception in symbols 2 and 3 1116 of the first slot and may perform CB-based combination of retransmitted data on the basis of a subsequently received indication, thereby obtaining additional gain. Particularly, to fit a long PUCCH timing (slot n+2) for HARQ feedback transmission to a cell-edge UE, the following conditions may be considered.

1. Bundling ACK/NACK in One PUCCH Resource (Latest Allocated)

Upon receiving the first control channel transmission (HARQ ID=#0, allocation HARQ PUCCH resource #0) from the base station and the second transmission (HARQ ID=#1, allocation HARQ PUCCH resource #0) including the retransmission, the UE may decode received information and may transmit an ACK/NACK message pertaining to whether decoding is successful. When an allocated resource is one bit, an ACK/NACK may be transmitted pertaining to whether decoding is successful. When the resource is two bits or more, an ACK/NACK may be transmitted in units of a CB or a set of CBs. PUCCH resource allocation may be performed implicitly or explicitly.

2. Multiplexing

Upon receiving the first control channel transmission (HARQ ID=#0, allocation HARQ PUCCH resource #0) from the base station and the second transmission (HARQ ID=#1, allocation HARQ PUCCH resource #1) including the retransmission, the UE may decode received information and may transmit an ACK/NACK message pertaining to whether decoding is successful. When each allocated resource is one bit, it is possible to separately transmit an ACK/NACK via each resource or to support two-bit multiple feedback (00, 01, 10, and 11 are separately interpreted) by combining ACK/NACKs. PUCCH resource allocation may be performed implicitly or explicitly. In the embodiment, two-bit multiple feedback may be interpreted differently depending on the embodiment.

3. Channel Selection

Upon receiving the first control channel transmission (HARQ ID=#0, allocation HARQ PUCCH resource #0) from the base station and the second transmission (HARQ ID=#1, allocation HARQ PUCCH resource #1) including the retransmission, the UE may decode received information and may transmit an ACK/NACK message pertaining to whether decoding is successful. When each allocated resource is one bit, the UE may selectively transmit an ACK/NACK. Here, the UE may select the resource allocated for the second transmission. In addition, the UE may transmit an ACK/NACK through the selected resource in accordance with the decoding result according to a preset rule.

Figure 12:
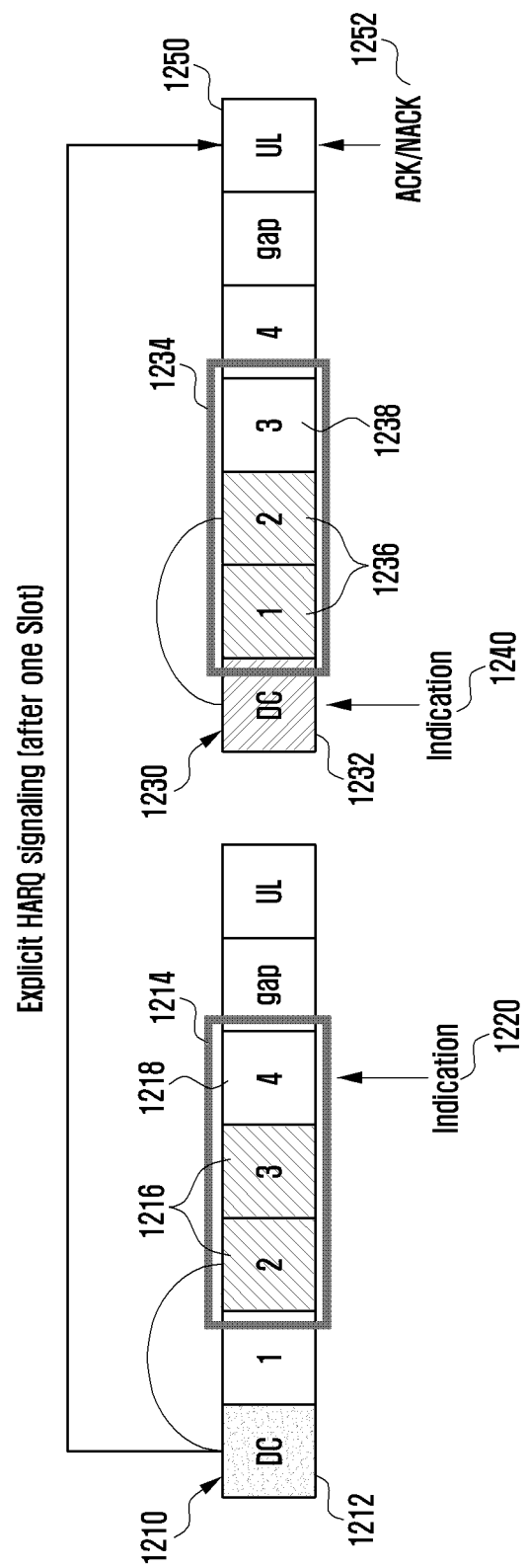
FIG. 12 illustrates a method of transmitting and receiving feedback information for supporting a plurality of services according to still another embodiment of the disclosure.
Figure 13:
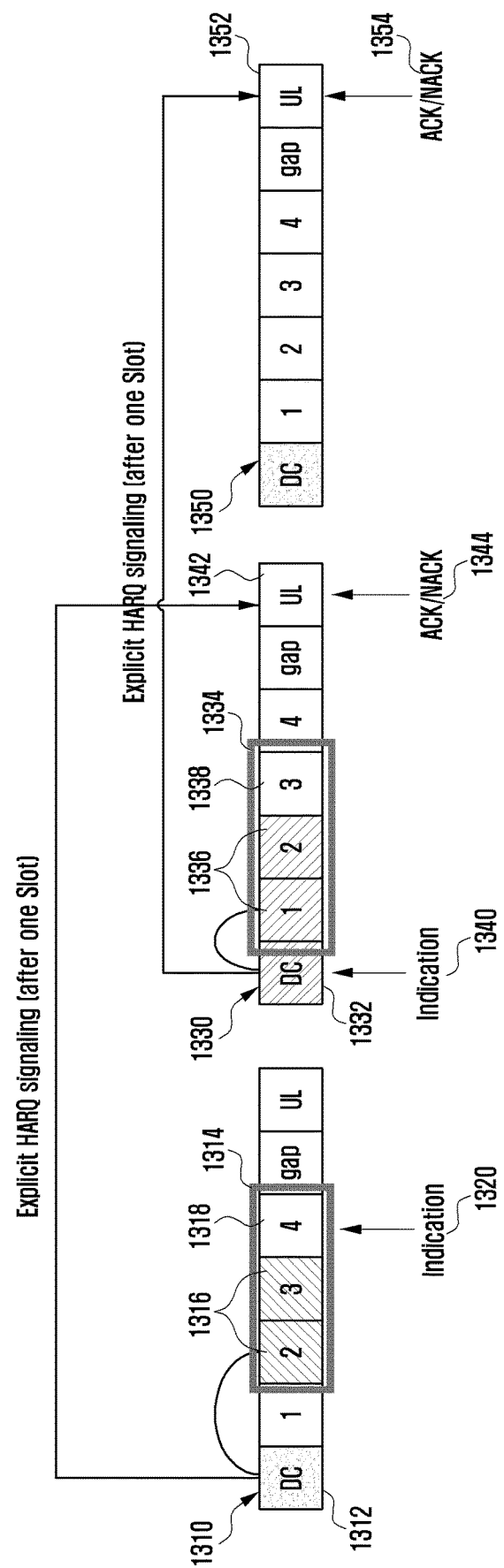
FIG. 13 illustrates a method of transmitting and receiving feedback information for supporting a plurality of services according to yet another embodiment of the disclosure.

FIG. 12 illustrates a method of transmitting and receiving feedback information for supporting a plurality of services according to still another embodiment of the disclosure, and FIG. 13 illustrates a method of transmitting and receiving feedback information for supporting a plurality of services according to yet another embodiment of the disclosure.

FIG. 12 and FIG. 13 illustrate the case in which a base station may transmit a signal to a UE and scheduling is established such that the UE basically transmits an explicit HARQ signal to the base station in an n+1th slot. Specifically, FIG. 12 illustrates an HARQ feedback process for a self-contained UE, and FIG. 13 illustrates an HARQ feedback process for a non-self-contained UE.

Referring to FIG. 12, a base station may transmit downlink data scheduling information and ACK/NACK timing information related thereto through a downlink control channel of a first slot 1210. In the embodiment, an ACK/NACK timing may be an uplink control channel 1250 of a second slot 1230 after one slot. This embodiment may be performed in a self-contained UE in order to decode retransmitted data after one slot and to transmit an ACK/NACK in the same slot, but is not limited thereto.

Referring to FIG. 13, a base station may transmit downlink data scheduling information and ACK/NACK timing information related thereto through a downlink control channel of a first slot 1310. In the embodiment, an ACK/NACK timing may be an uplink control channel 1342 of a second slot 1330 after one slot. The embodiment of FIG. 13 discloses a timing relationship that can be established in a non-self-contained UE, in which case an ACK/NACK of retransmission cannot be transmitted in the uplink control channel 1342 of the second slot 1330, and thus the UE may receive information related to a separate ACK/NACK timing in a downlink control channel 1332 of the second slot and may transmit an ACK/NACK of retransmission in an uplink control channel 1352 of a third slot 1350 in response.

In the embodiment, according to the operation of the base station, when a certain number or greater of CBs or RBs is punctured for providing a URLLC service with respect to a UE receiving a particular eMBB service in a particular slot, the base station may transmit information indicating whether to perform retransmission immediately to the UE, as indicated by reference numeral 1220, 1240, 1320, or 1340, at the time when reallocation is possible (the next slot in the embodiment) rather than waiting for the HARQ timing of the UE.

As illustrated in FIG. 12, the base station may perform downlink data transmission to the UE in a first slot 1210 using HARQ ID #0 and allocation HARQ PUCCH resource #0 and may perform second transmission 1236 and 1238 including retransmission by repeatedly allocating HARQ ID

0 and allocation HARQ PUCCH resource #0. In this case, once only an NDI is toggled without any indication, the UE may flush a buffer associated with data received in the first slot and may perform decoding in response to the retransmission. Further, the foregoing indication may transmit the HARQ ID and the PUCCH resource. The indication may be common DCI or UE-specific DCI.

Further, in FIG. 12, the base station may perform downlink data transmission to the UE in the first slot 1210 using HARQ ID #0 and allocation HARQ PUCCH resource #0 and may perform second transmission including retransmission by differently allocating HARQ ID #0 and allocation HARQ PUCCH resource #1. In this case, the UE may transmit the decoding result in response to the retransmission through PUCCH resource #1 and may transmit a feedback result through a resource selected from among #0 or #1 on the basis of the decoding result.

As illustrated in FIG. 13, the base station may perform downlink data transmission to the UE in a first slot 1310 using HARQ ID #0 and allocation HARQ PUCCH resource #0 and may perform second transmission including retransmission by differently allocating HARQ ID #0 and allocation HARQ PUCCH resource #1 of a next slot 1330. Here, if an indication is transmitted together, an HARQ ACK/NACK timing may be determined in an implicit manner, or a retransmission timing may be determined through separate information transmission. In one embodiment, even though a default HARQ ACK/NACK timing is preset, the very next slot may be determined as the timing, instead of the preset value, after retransmission. A retransmission timing may also be determined without explicit signaling, and an ACK/NACK 1354 of retransmission may be transmitted through an uplink control channel 1352 in the very next slot 1350 in the embodiment.

Also, according to the UE operation, the UE may identify failure of reception in symbols 2 and 3 1216 and 1316 of the first slot and may perform CB-based combination of retransmitted data on the basis of a subsequently received indication, thereby obtaining additional gain. Particularly, to fit a long PUCCH timing (slot n+2) for HARQ feedback transmission to a cell-edge UE, the following conditions may be considered.

In FIG. 12, as described above in the embodiments, an ACK/NACK 1252 of retransmission may be transmitted in an uplink control channel 1250 of the second slot 1230.

In the embodiment of FIG. 13, the UE may transmit an NACK in an uplink control channel 1342 of an N+1th slot 1330 or may not perform any transmission operation (DTX).

Further, in FIG. 13, the UE may perform decoding and ACK/NACK transmission using a CB4 Nth slot and a CB3 N+1th slot in an N+2th slot in initial transmission and retransmission.

In the embodiments of FIG. 12 and FIG. 13, as in FIG. 11, additional data may also be allocated at the retransmission time, in which case an operation similar to that in FIG. 11 may be performed.

According to the embodiment, it is possible to effectively transmit data using different types of service in a communication system. In addition, the embodiment may provide a method enabling the coexistence of data transmission of heterogeneous services, thereby satisfying the requirements of each service and reducing a delay in transmission time or enabling the efficient use of at least one of frequency-time resources and spatial resources. Also, it is possible to reduce the usage of an HARQ buffer memory of a UE using additional base station signaling before transmitting an HARQ ACK/NACK message.

Figure 14:
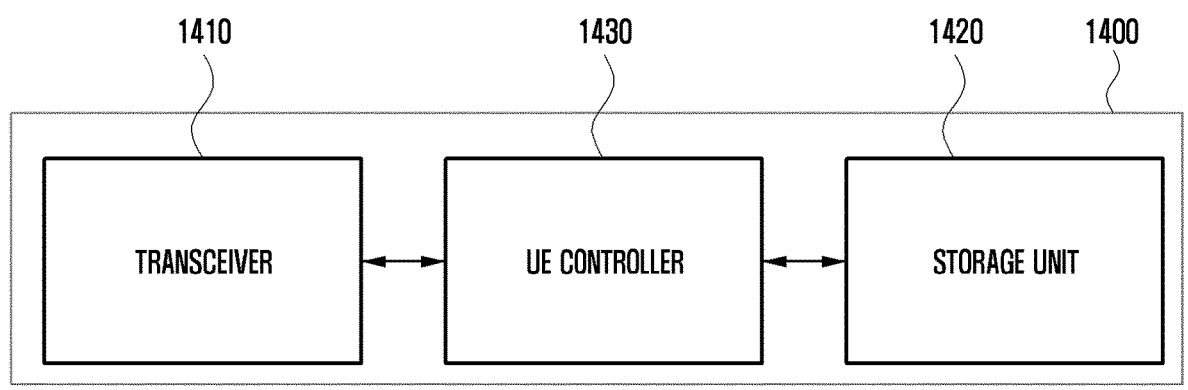
FIG. 14 illustrates a UE according to an embodiment of the disclosure.

FIG. 14 illustrates a UE according to an embodiment of the disclosure.

Referring to FIG. 14, the UE 1400 according to the embodiment includes a transceiver 1410, a storage unit 1420, and a controller 1430.

The transceiver 1410 may transmit and receive signals to and from a base station.

The storage unit 1420 may store at least one of information associated with the UE 1400 and information transmitted and received through the transceiver 1410.

The controller 1430 may control the operation of the UE 1400 and may perform overall control of the UE to perform operations of the UE described above in the embodiments. The controller 1430 may include at least one processor.

Figure 15:
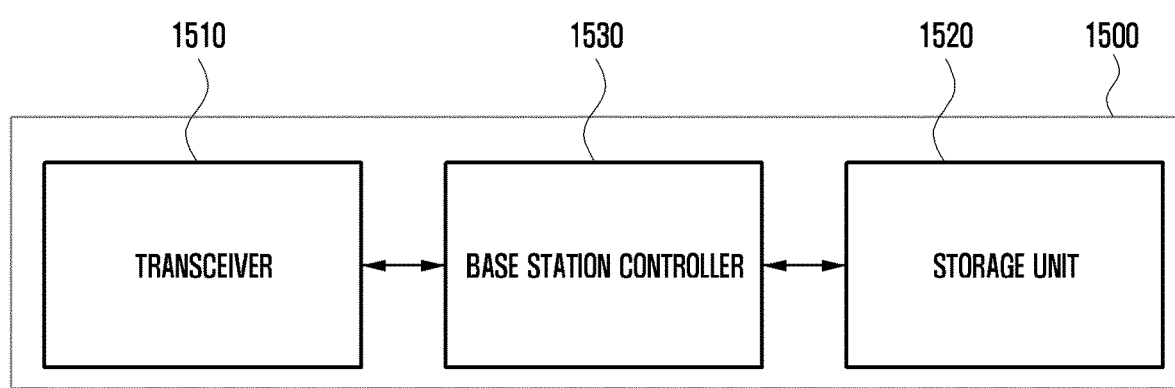
FIG. 15 illustrates a base station according to an embodiment of the disclosure.

FIG. 15 illustrates a base station according to an embodiment of the disclosure.

Referring to FIG. 15, the base station 1500 according to the embodiment includes a transceiver 1510, a storage unit 1520, and a controller 1530.

The transceiver 1510 may transmit and receive signals to and from a UE and other network entities.

The storage unit 1520 may store at least one of information associated with the base station 1500 and information transmitted and received through the transceiver 1510.

The controller 1530 may control the operation of the base station 1500 and may perform overall control of the base station to perform operations of the base station described above in the embodiments. The controller 1530 may include at least one processor.

Although the embodiments have been described on the basis of downlink transmission, these embodiments may also be similarly applied to uplink transmission.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

What is claimed is:

1. A method of operating a user equipment (UE) for communication in a mobile communication system, the method comprising:

receiving a radio resource control (RRC) message from an external device;

based at least in part on the RRC message, identifying that radio resources for downlink with respect to the UE are to be allocated in a first region included in a plurality of regions;

based at least in part on the RRC message, identifying information for preemption indicating that at least part of the first region is to be preempted;

receiving a first Physical Downlink Control Channel (PDCCH) including a first downlink control information (DCI) in a first portion of the first region;

receiving a Physical Downlink Shared Channel (PDSCH) including a downlink data based at least part on the first DCI;

receiving a second PDCCH including a second DCI in a second portion of the first region transmitted later than the first portion; and identifying that at least part of the PDSCH is preempted based at least in part on the second DCI.

2. The method of claim 1, wherein the identifying of the portion of the PDSCH is performed based at least part on the information for preemption included in the RRC message, the information for preemption relating to a resource size in a time domain.

3. The method of claim 1, wherein the plurality of regions further includes a second region, the first region corresponding to a first bandwidth and the second region corresponding to a second bandwidth.

4. The method of claim 1, wherein at least part of the PDSCH is preempted such that the portion of the PDSCH is allocated for a first service configured to provide a high-speed or broadband data communication, and another portion of the PDSCH larger than the portion is allocated for a second service configured to provide a low-latency or high-reliability communication.

5. The method of claim 1, wherein the first DCI includes unit information for performing feedback with respect to the PDSCH.

6. The method of claim 1, further comprising:
decoding the PDSCH based on the second DCI.

7. The method of claim 1, further comprising:
generating feedback with respect to the PDSCH based at least in part on the unit information; and
transmitting the feedback to the external device.

8. An electronic device comprising:
a transceiver; and
a controller configured to:
receive a radio resource control (RRC) message from an external device;
based at least in part on the RRC message, identify that radio resources for downlink with respect to the UE are to be allocated in a first region included in a plurality of regions;
based at least in part on the RRC message, identify information for preemption indicating that at least part of the first region is to be preempted;
receive a first Physical Downlink Control Channel (PDCCH) including a first downlink control information (DCI) in a first portion of the first region;
receive a Physical Downlink Shared Channel (PDSCH) including a downlink data based at least part on the first DCI;
receive a second PDCCH including a second DCI in a second portion of the first region transmitted later than the first portion; and
identify that at least part of the PDSCH is preempted based at least in part on the second DCI.

9. The electronic device of claim 8, wherein identifying of the portion of the PDSCH is performed based at least part on the information for preemption included in the RRC message, the information for preemption relating to a resource size in a time domain.

10. The electronic device of claim 8, wherein the plurality of regions further includes a second region, the first region corresponding to a first bandwidth and the second region corresponding to a second bandwidth.

11. The electronic device of claim 8, wherein at least part of the PDSCH is preempted such that the portion of the PDSCH is allocated for a first service configured to provide a high-speed or broadband data communication, and another portion of the PDSCH larger than the portion is allocated for a second service configured to provide a low-latency or high-reliability communication.

12. The electronic device of claim 8, wherein the first DCI includes unit information for performing feedback with respect to the PDSCH.

13. The electronic device of claim 8, wherein the processor is further configured to decode the PDSCH based on the second DCI.

14. The electronic device of claim 8, wherein the processor is further configured to:
generate feedback with respect to the PDSCH based at least in part on the unit information; and
transmit the feedback to the external device.

15. A non-transitory computer-readable medium storing instructions that, when executed by one or more processors, cause the one or more processors to perform operations comprising:
receiving a radio resource control (RRC) message from an external device;
based at least in part on the RRC message, identifying that radio resources for downlink with respect to the UE are to be allocated in a first region included in a plurality of regions;
based at least in part on the RRC message, identifying information for preemption indicating that at least part of the first region is to be preempted;
receiving a first Physical Downlink Control Channel (PDCCH) including a first downlink control information (DCI) in a first portion of the first region;
receiving a Physical Downlink Shared Channel (PDSCH) including a downlink data based at least part on the first DCI;
receiving a second PDCCH including a second DCI in a second portion of the first region transmitted later than the first portion; and
identifying that at least part of the PDSCH is preempted based at least in part on the second DCI.

16. The non-transitory computer-readable medium of claim 15, wherein the identifying of the portion of the PDSCH is performed based at least part on the information for preemption included in the RRC message, the information for preemption relating to a resource size in a time domain.

17. The non-transitory computer-readable medium of claim 15, wherein the plurality of regions further includes a second region, the first region corresponding to a first bandwidth and the second region corresponding to a second bandwidth.

18. The non-transitory computer-readable medium of claim 15, wherein at least part of the PDSCH is preempted such that the portion of the PDSCH is allocated for a first service configured to provide a high-speed or broadband data communication, and another portion of the PDSCH larger than the portion is allocated for a second service configured to provide a low-latency or high-reliability communication.

19. The non-transitory computer-readable medium of claim 15, wherein the first DCI includes unit information for performing feedback with respect to the PDSCH.

20. The non-transitory computer-readable medium of claim 15, wherein the operations further comprising:
decoding the PDSCH based on the second DCI.

21. The non-transitory computer-readable medium of claim 15, wherein the operations further comprising:
generating feedback with respect to the PDSCH based at least in part on the unit information; and
transmitting the feedback to the external device.

* * * * *